US010212630B2

(12) United States Patent
Trainin et al.

(10) Patent No.: US 10,212,630 B2
(45) Date of Patent: Feb. 19, 2019

(54) APPARATUS, SYSTEM AND METHOD OF FAST BASIC SERVICE SET (BSS) TRANSITION (FT)

(71) Applicant: INTEL IP CORPORATION, Santa Clara, CA (US)

(72) Inventors: Solomon B. Trainin, Haifa (IL); Michael Glik, Kfar Saba (IL); Elad Levy, Rishon LeZion (IL); Igor Brainman, Kfar Saba (IL); Izoslav Tchigevsky, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/281,093

(22) Filed: Sep. 30, 2016

(65) Prior Publication Data

US 2017/0223587 A1 Aug. 3, 2017

Related U.S. Application Data

(60) Provisional application No. 62/290,589, filed on Feb. 3, 2016.

(51) Int. Cl.
*H04W 12/06* (2009.01)
*H04W 36/08* (2009.01)
*H04W 36/24* (2009.01)
*H04W 48/10* (2009.01)

(52) U.S. Cl.
CPC ........... *H04W 36/08* (2013.01); *H04W 12/06* (2013.01); *H04W 36/24* (2013.01); *H04W 48/10* (2013.01)

(58) Field of Classification Search
CPC ..... H04W 12/06; H04W 36/08; H04W 36/24; H04W 48/10
See application file for complete search history.

(56) References Cited

U.S. PATENT DOCUMENTS

2012/0311661 A1 12/2012 Forssell
2012/0327870 A1 12/2012 Gradhi et al.
(Continued)

FOREIGN PATENT DOCUMENTS

WO 2014066536 5/2014

OTHER PUBLICATIONS

International Search Report and Written Opinion for PCT/US2017/012013, dated Apr. 21, 2017, 10 pages.
(Continued)

*Primary Examiner* — Kashif Siddiqui
(74) *Attorney, Agent, or Firm* — Shichrur & Co.

(57) ABSTRACT

Some demonstrative embodiments include apparatuses, devices, systems and methods of a Fast Basic Service Set (BSS) Transition (FT). For example, a wireless station (STA) may be configured to process at least one frame from at least one advertiser Access Point (AP) over a first frequency band while the STA is associated with a current AP over the first frequency band, the frame including a Multi-band Mobility Domain Element (MMDE) corresponding to a target AP; and to transmit to the advertiser AP an FT authentication request frame over the first frequency band to request an FT from the current AP on the first frequency band to the target AP on the second frequency band, the FT request frame including the MMDE corresponding to the target AP.

25 Claims, 10 Drawing Sheets

(56) References Cited

U.S. PATENT DOCUMENTS

| | | | | |
|---|---|---|---|---|
| 2013/0308543 | A1* | 11/2013 | Cordeiro | H04W 12/04 370/328 |
| 2013/0329600 | A1* | 12/2013 | Vedula | H04W 8/22 370/254 |
| 2017/0019865 | A1* | 1/2017 | Wang | H04W 48/14 |
| 2017/0064602 | A1* | 3/2017 | Kotecha | H04W 28/0289 |
| 2018/0084538 | A1* | 3/2018 | Jupudi | H04W 72/048 |

OTHER PUBLICATIONS

P.Machan et al., 'Performance evaluation of IEEE 802.11 fast BSS transition algorithms', In:Wireless and Mobile Networking Conference (WMNC), 2010 Third Joint IFIP, Oct. 13-15, 2010, 6 pages.
Intel Corporation, 'Some LB199 proposed resolutions', In: IEEE 802.11 WLANs WG, Nov. 26, 2013, 60 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
IEEE Std 802.11r™-2008. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 2: Fast Basic Service Set (BSS) Transition, Jul. 15, 2008, 126 pages.
International Preliminary Report on Patentability for International Application No. PCT/US2017/012013, dated Aug. 16, 2018, 7 pages.

* cited by examiner

APPARATUS, SYSTEM AND METHOD OF FAST BASIC SERVICE SET (BSS) TRANSITION (FT)

CROSS REFERENCE

This Application claims the benefit of and priority from U.S. Provisional Patent Application No. 62/290,589 entitled "APPARATUS, SYSTEM AND METHOD OF FAST BASIC SERVICE SET (BSS) TRANSITION (FT)", filed Feb. 3, 2016, the entire disclosure of which is incorporated herein by reference.

TECHNICAL FIELD

Embodiments described herein generally relate to Fast Basic Service Set (BSS) Transition (FT).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
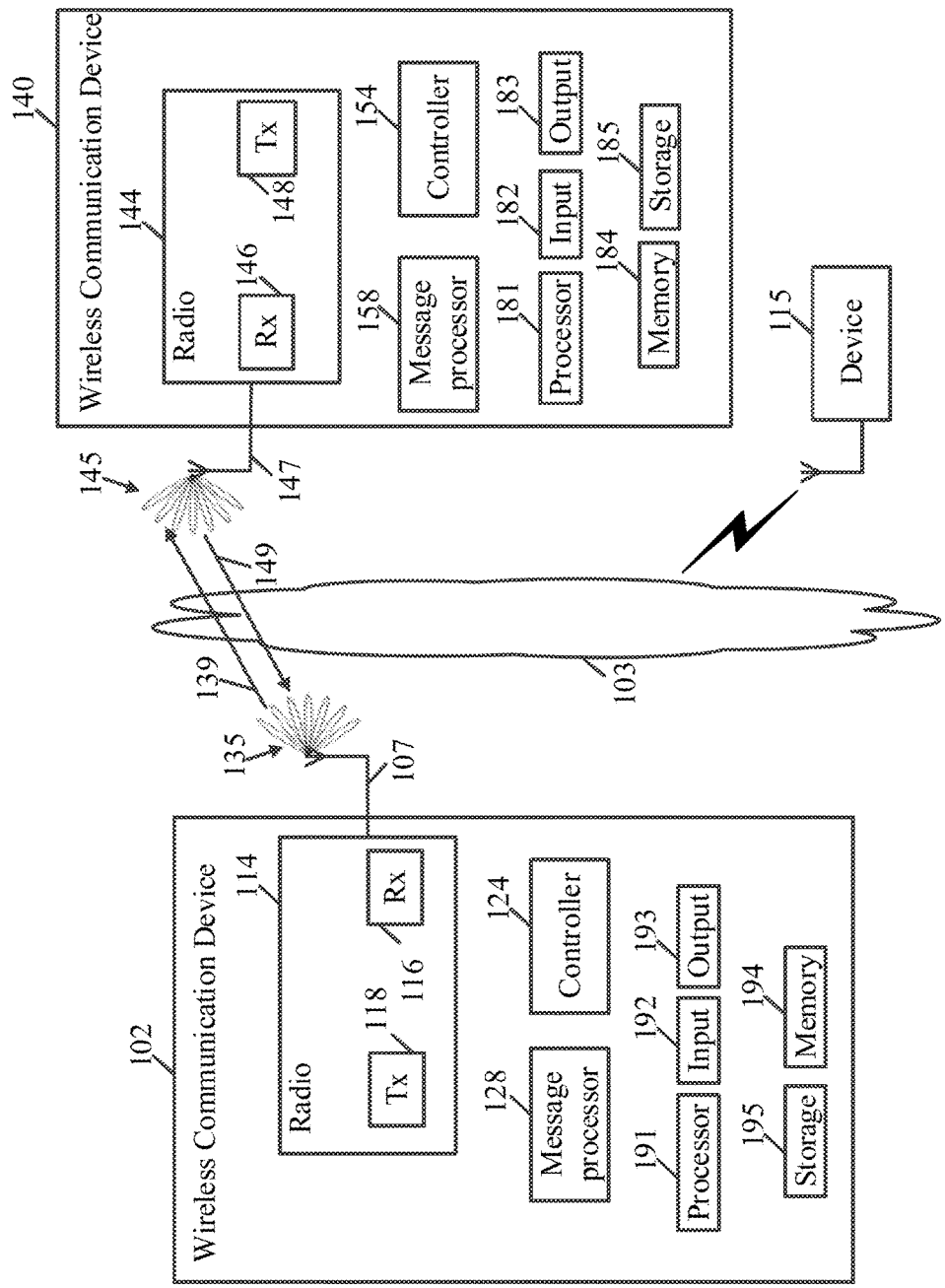
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE802.11ac-2013 (*"IEEE P802.11ac-2013, IEEE Standard for Information Technology—Telecommunications and Information Exchange Between Sys-* tems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); IEEE-802.11REVmc ("IEEE 802.11-REVmc™/D6.0, June 2016, draft standard for Information technology—Telecommunications and information exchange between systems Local and metropolitan area networks Specific requirements; Part 11: Wireless LAN Medium Access Control (MAC) and Physical Layer (PHY) Specification"); IEEE 802.11ax (IEEE 802.11ax, High Efficiency WLAN (HEW)); IEEE 802.11ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz); IEEE 802.11r (IEEE 802.11r-2008, IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 2: Fast Basic Service Set (BSS) Transition, 15 Jul. 2008)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or a wireless communication device 115.

In some demonstrative embodiments, devices 102, 115 and/or 140 may include a mobile device or a non-mobile, e.g., a static, device.

For example, devices 102, 115 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 and/or device 115 may include, for example, one or more of a processor 181, an input unit 182, an output unit 183, a memory unit 184, and/or a storage unit 185. Devices 102, 115 and/or 140 may optionally include other suitable hardware components and/or software components. In some demonstrative embodiments, some or all of the components of one or more of devices 102, 115 and/or 140 may be enclosed in a common housing or packaging, and may be interconnected or operably associated using one or more wired or wireless links. In other embodiments, components of one or more of devices 102, 115 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 115 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In some demonstrative embodiments, device 102, device 115 and/or device 140 may include one or more radios including circuitry and/or logic to perform wireless communication between devices 102, 115, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data.

For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145. For example, device 102 may transmit a directional transmission 139 to device 140, and/or device 140 may transmit a directional transmission 149 to device 102.

In some demonstrative embodiments, device 102 may include a controller 124, and/or devices 140 and/or 115 may include a controller 154. Controllers 124 and/or 154 may be configured to perform one or more communications, may generate and/or communicate one or more messages and/or transmissions, and/or may perform one or more functionalities, operations and/or procedures between devices 102, 140, 115, and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102, device 140 and/or device 115 may include, operate as, perform the role of, and/or perform one or more functionalities of, one or more DMG STAs. For example, device 102 may include, operate as, perform the role of, and/or perform one or more functionalities of, at least one DMG STA, device 140 may include, operate as, perform the role of, and/or perform one or more functionalities of, at least one DMG STA, and/or device 115 may include, operate as, perform the role of, and/or perform one or more functionalities of, at least one DMG STA.

In other embodiments, devices 102, 140 and/or 115 may include, operate as, perform the role of, and/or perform one or more functionalities of, any other wireless device and/or station, e.g., a WLAN STA, a WiFi STA, and the like.

In some demonstrative embodiments, device 102, device 140, and/or device 115 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102, device 140, and/or device 115 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102, device 140, and/or device 115 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102, 140 and/or 115 may be configured to operate in accordance with one or more Specifications, for example, including, one or more *IEEE 802.11 Specifications*, e.g., an *IEEE 802.11ad Specification*, an *IEEE 802.11REVmc Specification*, an *IEEE 802.11ay Specification*, and/or any other specification and/or protocol.

Some demonstrative embodiments may be implemented, for example, as part of a new standard in an mmWave band, e.g., a 60 GHz frequency band or any other directional band, for example, as an evolution of an *IEEE 802.11ad Specification*.

In some demonstrative embodiments, devices 102, 140 and/or 115 may be configured according to one or more standards, for example, in accordance with an *IEEE 802.11ay Standard*, which may be, for example, configured to enhance the efficiency and/or performance of an *IEEE 802.11ad Specification*, which may be configured to provide Wi-Fi connectivity in a 60 GHz band.

Some demonstrative embodiments may enable, for example, to significantly increase data transmission rates defined in the *IEEE 802.11ad specification*, which may, for example, satisfy growing demand in network capacity for new coming applications.

Some communications over a wireless communication band, for example, a DMG band or any other band, may be performed over a single channel bandwidth (BW). For example, the *IEEE 802.11ad Specification* defines a 60 GHz system with a single channel bandwidth (BW) of 2.16 GHz, which is to be used by all Stations (STAs) for both transmission and reception.

In some demonstrative embodiments, devices 102, 140 and/or 115 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, devices 102, 140 and/or 115 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102, device 140 and/or device 115 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, device 102, device 140 and/or device 115 may be configured to communicate over a Next Generation 60 GHz (NG60) network, an Extended DMG (EDMG) network, and/or any other network. For example, device 102, device 140 and/or device 115 may be configured to use channel bonding, for example, for communicating over the NG60 and/or EDMG networks.

Some Specifications, e.g., an *IEEE 802.11ad Specification*, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, device 102, device 140 and/or device 115 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, device 102, device 140 and/or device 115 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, device 102, device 140 and/or device 115 may be configured to support one or more mechanisms and/or features, for example, channel bonding, single user (SU) MIMO, and/or and multi user (MU) MIMO, for example, in accordance with an *IEEE 802.11ay Standard* and/or any other standard and/or protocol.

In some demonstrative embodiments, device 102, device 140 and/or device 115 may include, operate as, perform a role of, and/or perform the functionality of, one or more EDMG STAs. For example, device 102 may include, operate as, perform a role of, and/or perform the functionality of, at least one EDMG STA, device 140 may include, operate as, perform a role of, and/or perform the functionality of, at least one EDMG STA, and/or device 115 may include, operate as, perform a role of, and/or perform the functionality of, at least one EDMG STA.

In one example, an EDMG STA may include a DMG STA whose radio transmitter is capable of transmitting and receiving EDMG Physical Layer Convergence Procedure (PLCP) Protocol Data Units (PPDUs). The EDMG STA may perform any other additional or alternative functionality.

In some demonstrative embodiments, devices 102, 140 and/or 115 may include EDMG STAs capable of communicating in an EDMG BSS.

In some demonstrative embodiments, devices 102, 140 and/or 115 may be configured to perform one or more operations of a Fast Basis Service Set (BSS) Transition (FT), for example, to allow a station, for example, an FT Originator (FTO) STA, to move from a first AP STA (also referred to as the "current AP") to a second AP STA (also referred to as the "target AP"), e.g., as described below.

In one example, device 102 may be configured to include, operate as, perform the role of, and/or perform the functionality of the FTO, device 140 may be configured to include, operate as, perform the role of, and/or perform the functionality of the current AP, and/or device 115 may be configured to include, operate as, perform the role of, and/or perform the functionality of the target AP, e.g., as described below.

In another example, device 102 may be configured to include, operate as, perform the role of, and/or perform the functionality of the FTO, and/or device 140 may be configured to include, operate as, perform the role of, and/or perform the functionality of the current AP and the target AP, e.g., as described below.

In some demonstrative embodiments, the FT may allow, for example, to reduce a time that connectivity is lost between a STA and a Distribution System (DS) during a BSS transition.

In some demonstrative embodiments, one or more FT protocols may be applied, for example, to STA transitions between APs, e.g., within a same mobility domain, which is within a same Extended Service Set (ESS).

In some demonstrative embodiments, a mobility domain may include, for example, a set of BSSs, within the same ESS, which, for example, support fast BSS transition, e.g., between themselves. The set of BSSs may be identified, for example, by a mobility domain identifier (MDID), which may correspond to the set of BSSs.

In some demonstrative embodiments, the MDID may include, for example, an identifier, which may be configured to name a mobility domain.

In one example, an FT protocol may support, for example, a STA movement from one BSS in an ESS to another BSS within the ESS, for example, a change of association by a STA that is from one BSS in an ESS to another BSS within the same ESS. According to this example, the FT may minimize an amount of time that data connectivity is lost between the STA and the DS.

In some demonstrative embodiments, the DS may include, for example, a system to interconnect a set of BSSs and integrated local area networks (LANs) to create an ESS. In other embodiments, the DS may include any other additional or alternative elements.

In some demonstrative embodiments, an FTO may move from a current AP to a target AP, e.g., utilizing one or more FT protocols, for example, by performing one or more message exchanges, for example, according to a first mechanism, e.g., an "over-the-air" mechanism.

For example, according to the over-the-air mechanism, the FTO may communicate directly with the target AP, for example, using an authentication in accordance with an *IEEE* 802.11 *Specification*, e.g., using an FT authentication algorithm. The over-the-air mechanism may utilize any additional or alternative messages, frames and/or mechanisms.

In some demonstrative embodiments, an FTO may move from its current AP to a target AP, e.g., utilizing one or more FT protocols, for example, by performing one or more message exchanges according to a second mechanism, e.g., an "over the DS" mechanism.

For example, according to the over-the-DS mechanism, the FTO may communicate with the target AP via the current AP. For example, the communication between the FTO and the target AP may be carried in FT action frames, which may be communicated between the FTO and the current AP. For example, communication between the current AP and target AP may be via an encapsulation of FT Action Frames, for example, using Remote Request or Remote Response frames. The over-the-DS mechanism may utilize any additional or alternative messages, frames and/or mechanisms.

In some demonstrative embodiments, the one or more FT protocols may include, for example, an FT resource request protocol, which may allow, for example, an FTO to request resources, e.g., prior to reassociation.

Some demonstrative embodiments may be configured to allow applying the fast BSS transition to a directive multigigabit network, e.g., as described below.

Some demonstrative embodiments, e.g., as described below, may be implemented, for example, to address one or more potential issues and/or technical problems, which may arise, for example, with respect to implementing an FT in a network communicating over a directional band, e.g., a DMG network.

Some demonstrative embodiments may be implemented, for example, to address one or more potential issues and/or technical problems, which may arise, for example, with respect to implementing an FT in a BSS in different frequency bands and channels, for example, the DMG BSS and the non-DMG BSS, e.g., as described below.

In some demonstrative embodiments, in some networks the current AP and the target AP may use the same BSSID. Accordingly, in some implementations, use cases and/or scenarios, it may not be correct and/or necessary to assume, e.g., when using the over-the-air mechanism and/or the over-the-DS mechanism, that there are different BSSIDs between the current AP and the target AP. In one example, an AP may simultaneously support multiple frequency bands, and the FT may be relevant to move between BSS's residing in different bands, e.g., if one of the bands is a directional band, e.g., a 60 GHz band.

In some demonstrative embodiments, devices 102, 115 and/or 140 may be configured to support and/or allow a fast BSS transition to be used for transition within a mobility domain that includes a BSS in different frequency bands and channels, e.g., a DMG BSS and a non-DMG BSS, e.g., as described below.

In one example, a scanning procedure, e.g., even an active scanning procedure, in a mobility domain that includes BSSs in different frequency bands and/or channels may require time, e.g., which may be substantially longer than a time for scanning in lower bands, for example, due to a directive nature of the DMG band, and/or lack of fairness among DMG Overlapping BSSs (OBSS).

In another example, a DMG STA may use a radio and/or antennas, which may be different from a non-DMG STA. According to this example, an FTO, which may be active in a mobility domain that includes a DMG BSS may be required to operate in parallel both DMG and non-DMG radios and/or antennas, which may substantially increase power consumption of the DMG STA.

Some demonstrative embodiments may be configured to allow applying the fast BSS transition to a DMG network, for example, to allow minimizing operation in parallel of both the DMG radio and/or antennas and the non-DMG radio and/or antennas, e.g., as described below.

There are no known solutions to address at least the above-mentioned issues and/or problems. For example, a Fast Session Transfer (FST) Protocol that exploits equal BSSID in different bands may not be able to address BSS transition, e.g., as it may be agnostic to the way the BSS transition is provided.

In some demonstrative embodiments, devices 102, 140 and/or 115 may be configured to allow an FTO to perform an FT authentication to a target AP, for example, using a frequency band and/or channel, which may be used in communication with a current AP, for example, even if the target AP uses a different frequency band and/or channel, e.g., as described below.

In some demonstrative embodiments, devices 102, 140 and/or 115 may be configured to generate, transmit, receive, access and/or process a Multiband Element, for example, a new or modified Multiband element, which may be configured, for example, to advertise information, e.g., including a band and/or a BSSID, which may be applicable for an FT, in conjunction with a mobility domain Identifier (ID) and/or an FT protocol to be used for authentication, e.g., as described below.

In some demonstrative embodiments, devices 102, 140 and/or 115 may be configured to utilize an FT resource request protocol, for example, to be used for different bands, e.g., as described below.

In some demonstrative embodiments, an advertiser AP, e.g., device 140, may be configured to generate and/or transmit a frame including Multiband Mobility Domain Element (MMDE) corresponding to a target AP, e.g., device 115, e.g., as described below.

In some demonstrative embodiments, controller 154 may be configured to control, cause and/or trigger device 140 to transmit the frame over a first frequency band.

In some demonstrative embodiments, the frame may include a beacon frame or a probe response frame. In other embodiments, the frame may a discovery frame, or any other type of frame.

In some demonstrative embodiments, controller 154 may be configured to control, cause and/or trigger message processor 158 to generate the frame including the MMDE, and transmitter 148 to transmit the frame.

In some demonstrative embodiments, the MMDE may include a band Identifier (ID) of a second frequency band, e.g., as described below.

In some demonstrative embodiments, one of the first and second frequency bands may include a directional frequency band, and another one of the first and second frequency bands may include a non-directional frequency band. For example, the first frequency band may include the non-directional frequency band, and the second frequency band may include the directional frequency band.

In some demonstrative embodiments, one of the first and second frequency bands may include a DMG band, and another one of the first and second frequency bands may include a non-DMG band. For example, the first frequency band may include the non-DMG frequency band, and the second frequency band may include the DMG band.

In other embodiments, the first and second frequency bands may include any other combination of any other two frequency bands, which may be different or the same, DMG bands or non-DMG bands.

In some demonstrative embodiments, the MMDE may include a BSS ID (BSSID) of a BSS of the target AP on the second frequency band, e.g., as described below.

In some demonstrative embodiments, the MMDE may include an MDID of a Mobility Domain (MD) to which the advertiser AP and the target AP belong. For example, the MMDE may include an MDID of an MD to which devices 140 and 115 belong.

In some demonstrative embodiments, the MMDE may include a Fast BSS Transition (FT) field including FT information corresponding to the target AP, e.g., as described below.

In some demonstrative embodiments, the FT field may include an FT capability and policy field, which may include, for example, an FT over DS field, and/or a resource request protocol capability field, e.g., as described below.

In some demonstrative embodiments, the MMDE may include a channel ID of a channel to communicate with the target AP over the second frequency band, e.g., as described below.

Figure 2:
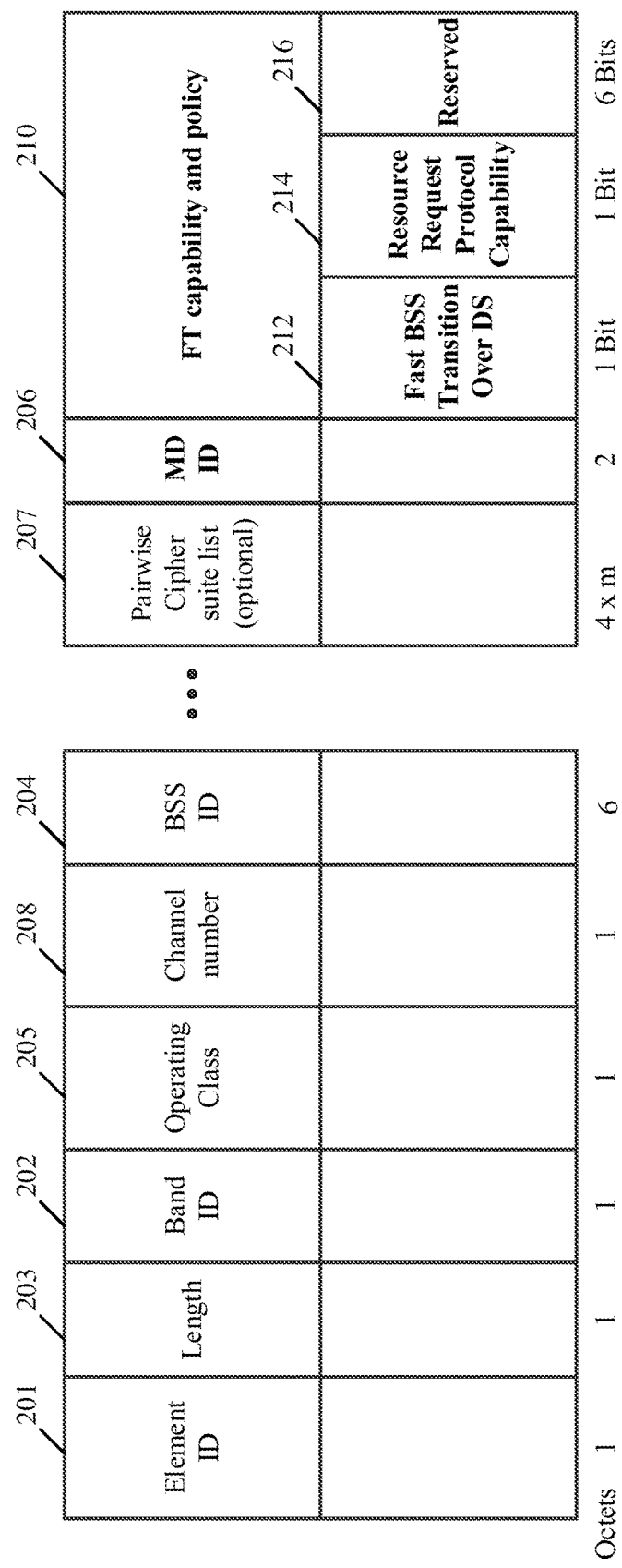
FIG. 2 is a schematic illustration of a structure of a Multiband Mobility Domain Element (MMDE), in accordance with some demonstrative embodiments.

Reference is made to FIG. 2, which schematically illustrates a structure of an MMDE 200, in accordance with some demonstrative embodiments.

In some demonstrative embodiments, an advertiser AP, e.g., device 140 (FIG. 1), may be configured to generate and transmit a frame, e.g., a beacon or a probe response frame, including at least one MMDE 200.

In some demonstrative embodiments, a STA, e.g., device 102 (FIG. 1), may be configured to receive and/or process a frame, e.g., a beacon or a probe response frame, including at least one MMDE 200, e.g., as described below.

In some demonstrative embodiments, an advertiser AP, e.g., device 140 (FIG. 1), may be configured to transmit the frame including at least one MMDE 200, for example, to advertise information corresponding to one or more target APs, for example, even information of multiple APs residing on different bands, for example, with the same or different BSSIDs.

In some demonstrative embodiments, an advertiser AP, e.g., device 140 (FIG. 1), may be configured to transmit the frame including at least one MMDE 200, for example, to advertise the information corresponding to the one or more target APs, for example, even in a single frame, e.g., a single beacon or probe response. For example, the frame may include a plurality of instances of MMDE 200 corresponding to a respective plurality of target APs to be advertized.

In some demonstrative embodiments, as shown in FIG. 2, MMDE 200 may include an element ID field 201, e.g., having a size of one octet, including a value to identify MMDE 200.

In some demonstrative embodiments, as shown in FIG. 2, MMDE 200 may include a length field 203, e.g., having a size of one octet, including a value to indicate a length of MMDE 200.

In some demonstrative embodiments, as shown in FIG. 2, MMDE 200 may include a band ID field 202, an operating class field 205, channel number field 208, and/or a BSS ID field 204, which may include information corresponding to the target AP advertized by MMDE 200, e.g., as described below.

In some demonstrative embodiments, band ID field 202 may include, for example, an identification of frequency band relating to operating class field 205 and/or channel number field 208.

In some demonstrative embodiments, operating class field 205 may indicate, for example, a channel set for which MMDE 200 is to apply. For example, the operating class field 205 and the channel number field 208 may be set to specify a channel frequency and spacing for which MMDE 200 is to apply. In one example, operating class field 205 may be set to a predefined value, e.g., "0", to indicate all operating classes within a frequency band specified by a value of band ID field 202.

In some demonstrative embodiments, channel number field 208 may be set, for example, to a number of a channel on which the target AP is to operate on. In one example, channel number field 208 may be set to a predefined value, e.g., "0", to indicate all channels within a frequency band specified by a value of band ID field 202.

In some demonstrative embodiments, BSSID field 204 may be set, for example, to specify a BSSID of a BSS operating on the channel and frequency band indicated by channel number field 208 and band ID field 202.

In some demonstrative embodiments, fields 202, 205, 208 and/or 204 may be set and/or configured to indicate any additional or alternative information.

In some demonstrative embodiments, band ID field 202 may be set to indicate a band ID of the second frequency band corresponding to the target AP advertized by MMDE 200, e.g., as described above.

In some demonstrative embodiments, BSSID field 204 may be set to include the BSSID of the BSS of the target AP on the second frequency band, e.g., as described above.

In some demonstrative embodiments, cannel number field 208 may include the channel ID of the channel to communicate with the target AP over the second frequency band, e.g., as described above.

In some demonstrative embodiments, as shown in FIG. 2, MMDE 200 may optionally include one or more additional fields, for example, a Pairwise cipher suite list field 207, e.g., in accordance with an *IEEE* 802.11*ad Specification*, and/or one or more other fields.

In some demonstrative embodiments, as shown in FIG. 2, MMDE 200 may include an MDID field 206, e.g., subsequent to field 207 or at any other position in MMDE 200. For example, MDID field may have a length of 2 octets or any other length.

In some demonstrative embodiments, MDID field 206 may include the MD ID to which the advertiser AP and the target AP belong, e.g., as described above.

In some demonstrative embodiments, as shown in FIG. 2, MMDE 200 may include an FT capability and policy field 210, e.g., as described below.

In some demonstrative embodiments, an FT capability and policy field 210 may include, for example, an FT over DS field 212, a resource request protocol capability field 214, and/or a reserved field 216, e.g., as described below.

In some demonstrative embodiments, as shown in FIG. 2, field 212 may have a length of 1 bit, field 214 may have a length of 1 bit, and/or field 216 may have a length of 6 bits. In other embodiments, fields 212, 214, and/or 216 may have any other length.

In some demonstrative embodiments, fields 212 and 214 may be configured to signal information to control a behavior of STAs performing fast BSS transitions. In one example, field 210 may be configured, for example, in compliance with an *IEEE* 802.11*r Specification*.

For example, a STA, e.g., device 102 (FIG. 1), which receives a frame including MMDE 200 corresponding to a target AP, may use information in field 210 of the MMDE 200, for example, to determine one or more transition methods recommended by the target AP, and/or one or more protocols supported by the target AP, e.g., as described below.

Referring back to FIG. 1, in some demonstrative embodiments, an advertiser, e.g., device 140, may transmit a frame over the first frequency band including an MMDE, e.g., MMDE 200 (FIG. 2), corresponding to the target AP, e.g., device 115.

In some demonstrative embodiments, an FTO, e.g., device 102, may receive over the first frequency band the frame including the MMDE, e.g., MMDE 200 (FIG. 2), corresponding to the target AP, e.g., device 115.

In some demonstrative embodiments, the FTO may receive the frame, for example, while the STA is associated with a current AP over the first frequency band, e.g., as described below.

In some demonstrative embodiments, the current AP may belong to the MD.

In some demonstrative embodiments, controller 124 may be configured to control, cause and/or trigger device 102 to process the frame including an MMDE, e.g., MMDE 200 (FIG. 1) from the advertiser AP over the first frequency band, for example, while device 102 is associated with the current AP over the first frequency band.

In some demonstrative embodiments, controller 124 may be configured to control, cause and/or trigger receiver 116 to receive the frame and message processor 128 to process the fame including the MMDE.

In some demonstrative embodiments, controller 124 may be configured to control, cause and/or trigger device 102 to transmit to device 140 an FT authentication request frame over the first frequency band to request an FT from the current AP on the first frequency band to the target AP on the second frequency band, e.g., as described below.

In some demonstrative embodiments, the FT request frame may include the MMDE corresponding to the target AP, e.g., MMDE 200 (FIG. 2).

In some demonstrative embodiments, controller 124 may be configured to control, cause and/or trigger message processor 128 to generate the FT authentication request frame including the MMDE, and transmitter 118 to transmit the FT authentication request frame.

In some demonstrative embodiments, device 140 may receive the FT request frame including the MMDE corresponding to the target AP, e.g., device 115.

In some demonstrative embodiments, controller 154 may be configured to control, cause and/or trigger device 140 to process the FT request frame from device 102 over the first frequency band to request the FT from the current AP on the first frequency band to the target AP on the second frequency band.

In some demonstrative embodiments, the advertiser AP may include the current AP, e.g., as described below.

For example, device 140 may include the current AP and the advertiser AP. According to this example, device 102 may transmit the FT request frame to device 140 over the first frequency band, for example, to request from device 140 the FT from a BSS of device 140 on the first frequency band to a BSS of device 115 on the second frequency band, e.g., as described below.

In some demonstrative embodiments, the advertiser AP may be different from the current AP, e.g., as described below.

For example, device 140 may include the advertiser AP and the target AP, and device 115 may include the current AP. According to this example, device 102 may transmit the FT request frame to device 140 over the first frequency band, for example, to request from device 115 the over-the-air FT from a BSS of device 115 on the first frequency band to device 140 on the second frequency band, e.g., as described below.

In some demonstrative embodiments, the advertiser AP may include the target AP, and the FT may include an over-the-air FT, e.g., as described below.

For example, device 140 may include the current AP, the target AP, and the advertiser AP. According to this example, device 102 may transmit the FT request frame to device 140 over the first frequency band, for example, to request from device 140 the over-the-air FT from a BSS device 140 on the first frequency band to a BSS of device 140 on the second frequency band, e.g., as described below.

In some demonstrative embodiments, the target AP may be different from the advertiser AP, and the FT may include an FT over a Distribution system (DS) between the advertiser AP and the target AP, e.g., as described below.

For example, device 140 may include the current AP and the advertiser AP, device 115 may include the target AP, and devices 140 and 115 may have a DS between devices 140 and 115. According to this example, device 102 may transmit the FT request frame to device 140 over the first frequency band, for example, to request from device 140 the FT over the DS from a BSS of device 140 on the first frequency band to a BSS of device 115 on the second frequency band.

In some demonstrative embodiments, controller 154 may be configured to control, cause and/or trigger device 140 to transmit an FT authentication response to the FTO, e.g., to device 102.

In some demonstrative embodiments, the FT authentication response may include the MMDE corresponding to the target AP, e.g., MMDE 200 (FIG. 2).

In some demonstrative embodiments, controller 154 may be configured to control, cause and/or trigger message processor 158 to generate the FT authentication response including the MMDE corresponding to the target AP, and transmitter 148 to transmit the FT authentication response.

In some demonstrative embodiments, device 102 may receive the FT authentication response including the MMDE corresponding to the target APO, e.g., device 115.

In some demonstrative embodiments, controller 124 may be configured to control, cause and/or trigger device 102 to process the FT authentication response from device 140 including the MMDE corresponding to the target AP, e.g., device 115.

In some demonstrative embodiments, controller 124 may be configured to control, cause and/or trigger device 102 to re-associate with the target AP, e.g., device 115, over the second frequency band, for example, based on the FT authentication response.

Figure 3:
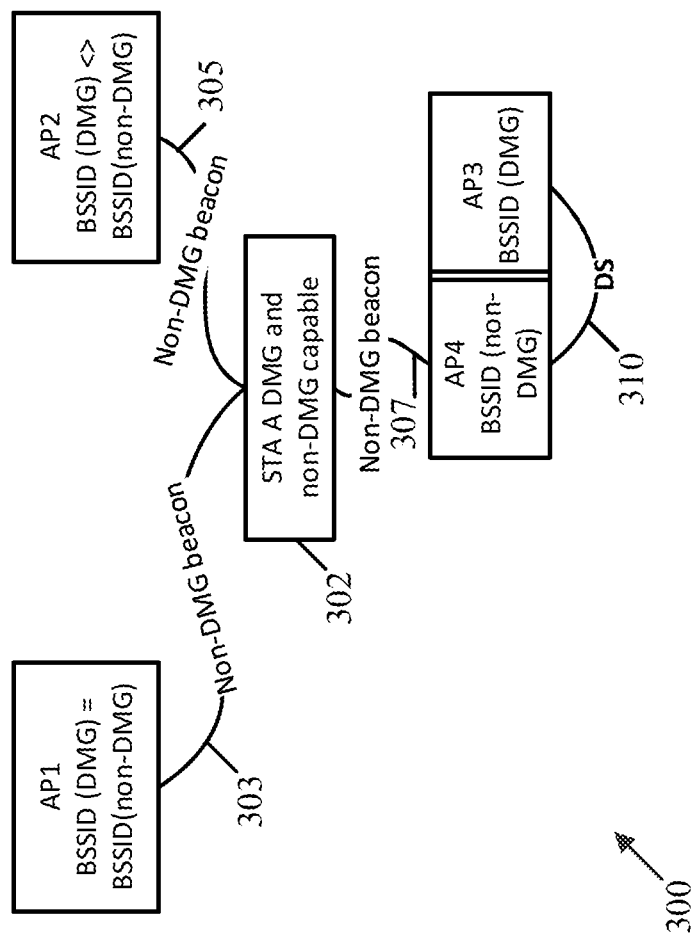
FIG. 3 is a schematic illustration of a topology of a mobility domain, in accordance with some demonstrative embodiments.

Reference is made to FIG. 3, which schematically illustrates a topology of a mobility domain 300, in accordance with some demonstrative embodiments.

In some demonstrative embodiments, as shown in FIG. 3, mobility domain 300 may include a STA 302, and one or more APs, denoted AP1, AP2, AP3, and AP4. For example, STA 302 may include, operate as, perform a role of, and/or perform the functionality of, device 102 (FIG. 1), and/or one or more of AP1, AP2, AP3, and/or AP4 may include, operate as, perform a role of, and/or perform the functionality of devices 140 and/or 115 (FIG. 1).

In some demonstrative embodiments, STA 302 may include a STA, which may be capable of communicating over both a DMG band and a non-DMG band.

In some demonstrative embodiments, as shown in FIG. 3, STA 302 may be associated with AP1 over a non-DMG band.

In some demonstrative embodiments, as shown in FIG. 3, STA 302 may receive one or more beacons 303 from AP1 over the non-DMG band. For example, beacons 303 may include a first MMDE, e.g., MMDE 200 (FIG. 2), corresponding to AP1, for example, to indicate AP1 supports communication over both a DMG band and a non-DMG band, e.g., using the same BSSID for both bands.

In some demonstrative embodiments, as shown in FIG. 3, STA 302 may receive one or more beacons 305 from AP2 over the non-DMG band. For example, beacons 305 may include a second MMDE, e.g., MMDE 200 (FIG. 2), corresponding to AP2, for example, to indicate AP2 supports communication over both a DMG band and a non-DMG band, e.g., using different BSSIDs for the DMG and non-DMG bands.

In some demonstrative embodiments, as shown in FIG. 3, AP4 and AP3 may utilize a DS 310 to connect between AP3 and AP4.

In some demonstrative embodiments, as shown in FIG. 3, STA 302 may receive one or more beacons 307 from AP4 over the non-DMG band. For example, beacons 307 may include a third MMDE, e.g., MMDE 200 (FIG. 2), corresponding to AP4, for example, to indicate AP4 supports communication over a non-DMG band, and AP3 supports communication over a DMG band.

In some demonstrative embodiments, the STA 302 may request to perform a Fast BSS transition from a current AP on the non-DMG band, e.g., AP1, to a target AP on the DMG band, e.g., one of AP1, AP2, and AP4, for example, according to one or more scenarios, e.g., as follows:

TABLE 1

| # | Current STA A band | Current AP | Speaks with AP | Target AP (DMG) | Band ID (Target) | Channel number (Target) Multiband element | BSS ID (Target) | MD ID Mobility domain element | Resource Request Protocol Capability | Fast BSS Transition over DS |
|---|---|---|---|---|---|---|---|---|---|---|
| 1 | Non-DMG | AP 1 | AP1 (non DMG) | AP 1 | 5 | 1 (60 GHz) | AP1 MAC address | 11 | 0 | 0 |

TABLE 1-continued

| # | Current STA A band | Current AP | Speaks with AP | Target AP (DMG) | Band ID (Target) Multiband element | Channel number (Target) | BSS ID (Target) | MD ID Mobility domain element | Resource Request Protocol Capability | Fast BSS Transition over DS |
|---|---|---|---|---|---|---|---|---|---|---|
| 2 | Non-DMG | AP 1 | AP2 (non DMG) | AP 2 | 5 (60 GHz) | 1 | AP2 BSS ID (DMG) | 11 | 0 | 0 |
| 3 | Non-DMG | AP 1 | AP4 (non-DMG) | AP 3 | 5 (60 GHz) | 1 | AP3 MAC address | 11 | 0 | 1 |

In some demonstrative embodiments, as shown in Table 1, STA 302 may determine, for example, from the first MMDE received from AP1, that AP1 supports communication over both a DMG band and a non-DMG band, and that AP1 uses the same BSSID for both the DMG band and the non-DMG band.

In some demonstrative embodiments, as shown in Table 1, STA 302 may determine, for example, from the first MMDE received from AP1, that an FT over-the-air using authentication frames is to be used for an FT to AP1 on the DMG band, e.g., if the Fast BSS Transition over DS field in the first MMDE is set to zero.

In some demonstrative embodiments, as shown in Table 1, STA 302 may determine, for example, from the second MMDE received from AP2, that AP2 supports communication over both a DMG band and a non-DMG band, and that AP2 uses different BSSIDs for the DMG band and the non-DMG band.

In some demonstrative embodiments, as shown in Table 1, STA 302 may determine, for example, from the second MMDE received from AP2, that an FT over-the-air using authentication frames is to be used for an FT to AP2 on the DMG band, e.g., if the Fast BSS Transition over DS field in the second MMDE is set to zero.

In some demonstrative embodiments, as shown in Table 1, STA 302 may determine, for example, from the third MMDE received from AP4, that AP3 supports communication over the DMG band, and the BSSID used by AP3 for the DMG band.

In some demonstrative embodiments, as shown in Table 1, STA 302 may determine, for example, from the third MMDE received from AP4, that an FT over-DS using authentication frames is to be used for an FT to AP3 on the DMG band, e.g., if the Fast BSS Transition over DS field in the third MMDE is set to one.

In some demonstrative embodiments, STA 302 may select to perform an FT from a current AP, e.g., AP1, on the non-DMG band, to a target AP, e.g., AP1, AP2 or AP3, over the DMG band, for example, based at least on the information in Table 1.

In some demonstrative embodiments, STA 302 may send a request to perform the FT to the current AP, e.g., to AP1, over the non-DMG band, for example, to request to perform the FT.

For example, STA 302 may select to perform an over-the-air FT from a BSS of AP1 on the non-DMG band to a BSS of AP1 on the DMG band.

Figure 4:
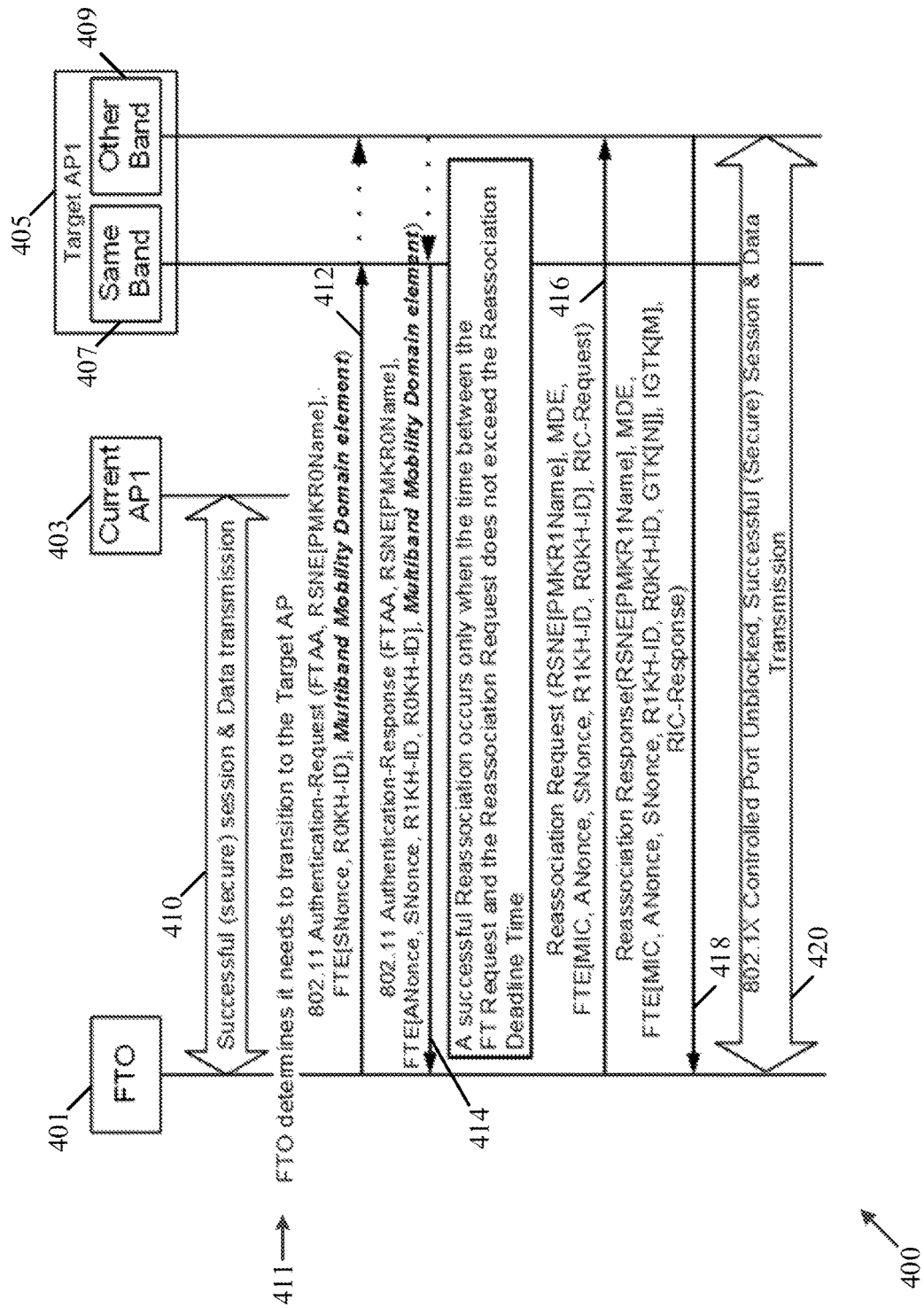
FIG. 4 is a schematic illustration of a sequence diagram of operations and communications between stations according to a Fast Basic Service Set (BSS) Transition (FT) protocol, in accordance with some demonstrative embodiments.

Reference is made to FIG. 4, which schematically illustrates a sequence diagram 400 of operations and communications between stations according to an FT protocol, in accordance with some demonstrative embodiments.

In some demonstrative embodiments, one or more of the operations and/or communications of FIG. 4 may be performed, for example, as part of an over-the-air FT protocol, for example, for moving an FTO 401, e.g., STA 302 (FIG. 3), from a first BSS of a current AP 403 on a first frequency band to a second BSS of a target AP 405 on a second frequency band.

In some demonstrative embodiments, as shown in FIG. 4, the current AP 403 and the target AP may be implemented by the same AP, e.g., AP1 (FIG. 3). For example, one or more of the operations and/or communications of FIG. 4 may be performed, for example, as part of an over-the-air FT protocol, for example, for moving FTO 401 from a first BSS of the current AP 403, e.g., AP1 (FIG. 3), over the first frequency band, to a second BSS of the target 405 AP, e.g., AP1 (FIG. 3), over a second frequency band.

In some demonstrative embodiments, as shown in FIG. 4, the target AP 405 may support communication over the first band ("same band") 407, which may be the same as the first band of the current AP 403, and communication over the second band ("other band") 409, which may be different from the first band. In one example, the first band may include a non-DMG band, and the second band may include a DMG band, e.g., as described above with reference to FIG. 3. In another example, the first band may include a DMG band, and the second band may include a non-DMG band.

In some demonstrative embodiments, as shown in FIG. 4, the FTO 401 and the current AP 403 may associate and may establish a secure session 410 between the FTO 403 and the current AP 403 over the first frequency band.

In some demonstrative embodiments, the FTO 401 may initiate an FT (411) to transition from the first BSS of the current AP 403 on the first frequency band to the second BSS of the target AP 405 over the second frequency band.

In some demonstrative embodiments, as shown in FIG. 4, the FTO 401 may transmit an FT authentication request frame 412 to the target AP 405, e.g., over the first frequency band.

In some demonstrative embodiments, as shown in FIG. 4, FT authentication request frame 412 may include an MMDE corresponding to the target AP 405, e.g., the MMDE corresponding to AP1 (FIG. 3).

In some demonstrative embodiments, as shown in FIG. 4, the target AP 405 may transmit an FT authentication response frame 414 to the FTO 401, e.g., in response to the authentication request frame 412.

In some demonstrative embodiments, as shown in FIG. 4, FT authentication response frame 414 may include the MMDE corresponding to the target AP 405, e.g., the MMDE corresponding to AP1 (FIG. 3).

In some demonstrative embodiments, as shown in FIG. 4, the FT authentication response frame 414 and/or the FT authentication request frame 412 may include one or more elements, for example, in accordance with an FT authentication sequence, e.g., in accordance with an *IEEE* 802.11 *Specification*. The FT authentication response frame 414 and/or the FT authentication request frame 412 may include any other additional or alternative elements.

In some demonstrative embodiments, as shown in FIG. 4, the FTO 401 may initiate a re-association with the target AP 405, for example, by transmitting a re-association request frame 416 to the target AP 405, for example, over the second frequency band.

In some demonstrative embodiments, as shown in FIG. 4, the re-association may be successful, for example, only if a time period between FT authentication request frame 412 and the re-association request frame 416 does not exceed a predefined time period, e.g., a Reassociation Deadline Time.

In some demonstrative embodiments, as shown in FIG. 4, the target AP 405 may transmit a re-association response frame 418 to the FTO 401, for example, over the second frequency band, e.g., in response to the re-association request frame 416.

In some demonstrative embodiments, as shown in FIG. 4, the FTO 401 and the target AP 405 may re-associate and may establish a secure session 420 between the FTO 401 and the target AP 405, e.g., over the second frequency band.

Referring back to FIG. 3, in some demonstrative embodiments, STA 302 may select to perform an FT from a current AP, e.g., AP1, on the non-DMG band, to a target AP, e.g., AP3, which may not communicate over the current frequency band of the current AP, e.g., the non-DMG band.

For example, STA 302 may select to perform an over-the-DS FT from a BSS of AP1 on the non-DMG band to a BSS of AP3 on the DMG band.

Figure 5:
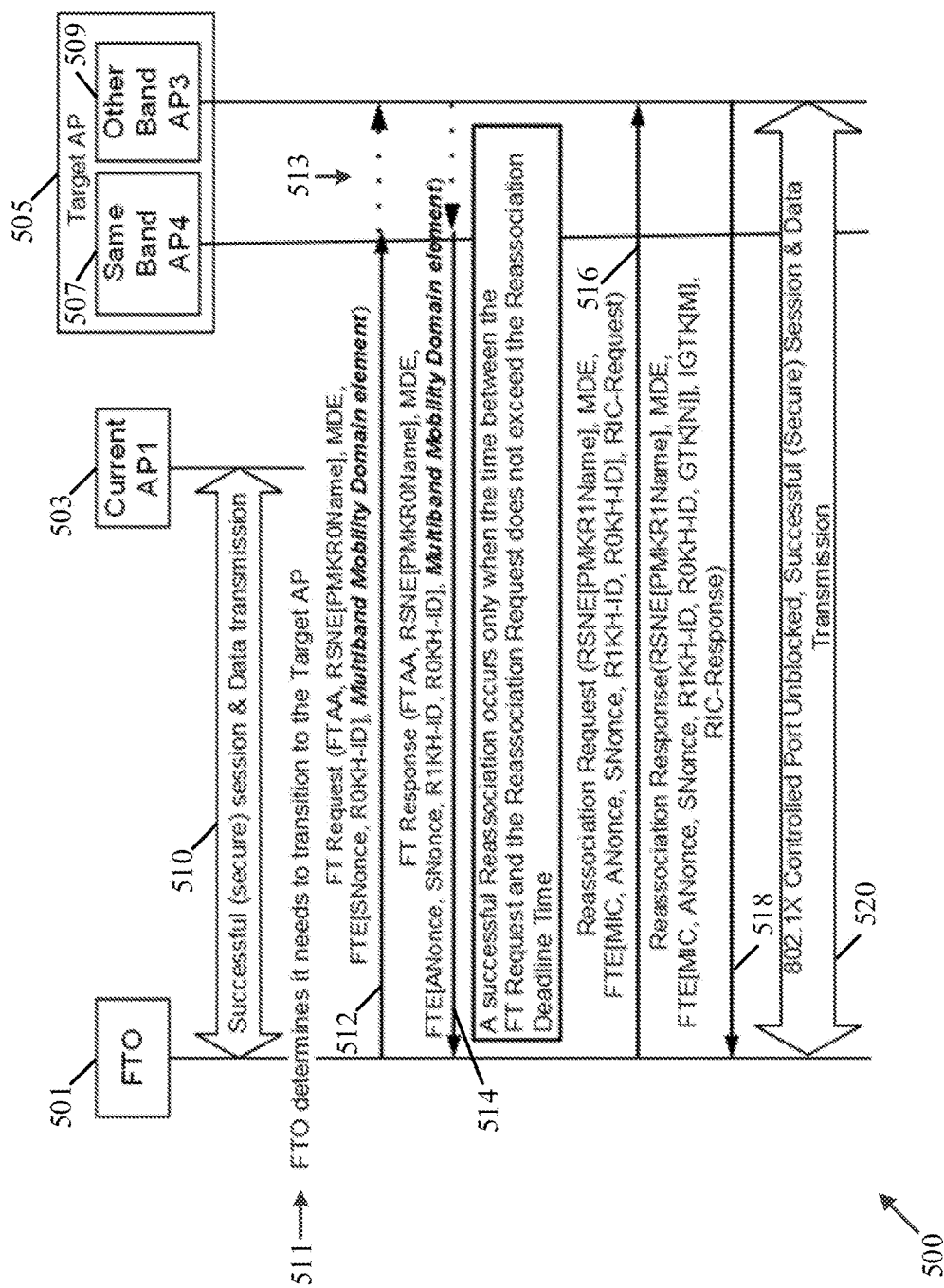
FIG. 5 is a schematic illustration of operations and communications between stations according to an FT protocol, in accordance with some demonstrative embodiments.

Reference is made to FIG. 5, which schematically illustrates a sequence diagram 500 of operations and communications between stations according to an FT protocol, in accordance with some demonstrative embodiments.

In some demonstrative embodiments, one or more of the operations and/or communications of FIG. 5 may be performed, for example, as part of an over-the-DS FT protocol, for example, for moving an FTO 501, e.g., STA 302 (FIG. 3), from a first BSS of a current AP 503 on a first frequency band to a second BSS of a target AP 505 on a second frequency band.

In some demonstrative embodiments, as shown in FIG. 5, the current AP 503 and the target AP may be implemented by different APs. For example, the current AP 503 may be implemented by AP1 (FIG. 3), and the target AP 505 may be implemented by AP3 (FIG. 3) via the DS connection with AP4 (FIG. 3). For example, one or more of the operations and/or communications of FIG. 5 may be performed, for example, as part of an over-the-DS FT protocol, for example, for moving FTO 501 from a first BSS of the current AP 503, e.g., AP1 (FIG. 3), over the first frequency band, to a second BSS of the target 505 AP, e.g., AP3 (FIG. 3), over a second frequency band.

In some demonstrative embodiments, as shown in FIG. 5, the AP4 may support communication over the first band ("same band") 507, which may be the same as the first band of the current AP 503, and the target AP3 may support communication over the second band ("other band") 509, which may be different from the first band. In one example, the first band may include a non-DMG band, and the second band may include a DMG band, e.g., as described above with reference to FIG. 3. In another example, the first band may include a DMG band, and the second band may include a non-DMG band.

In some demonstrative embodiments, as shown in FIG. 5, the FTO 501 and the current AP 503 may associate and may establish a secure session 510 between the FTO 501 and the current AP 503, e.g., over the first frequency band.

In some demonstrative embodiments, the FTO 501 may initiate an FT from the first BSS of the current AP 503 over the first frequency band to the second BSS of the target AP 505 over the second frequency band.

In some demonstrative embodiments, the FTO 501 may initiate an FT (511) to transition from the first BSS of the current AP 503 on the first frequency band to the second BSS of the target AP 505 over the second frequency band.

In some demonstrative embodiments, as shown in FIG. 5, the FTO 501 may transmit an FT authentication request frame 512 to the target AP 505, e.g., over the first frequency band.

In some demonstrative embodiments, as shown in FIG. 5, FT authentication request frame 512 may include an MMDE corresponding to the target AP 505, e.g., the MMDE corresponding to AP3 (FIG. 3).

In some demonstrative embodiments, as shown in FIG. 5, the target AP 505 may transmit an FT authentication response frame 514 to the FTO 501, for example, over the first frequency band, e.g., in response to the authentication request frame 512.

In some demonstrative embodiments, as shown in FIG. 5, FT authentication response frame 514 may include the MMDE corresponding to the target AP 505, e.g., the MMDE corresponding to AP3 (FIG. 3).

In some demonstrative embodiments, as shown in FIG. 5, FT authentication response frame 514 and/or the FT authentication request frame 512 may include one or more elements, for example, in accordance with an FT authentication sequence, e.g., in accordance with an *IEEE* 802.11 *Specification*. The FT authentication response frame 514 and/or the FT authentication request frame 512 may include any other additional or alternative elements.

In some demonstrative embodiments, as shown in FIG. 5, AP3 and AP4 of target AP 505 may communicate (513) the request frame 512 and the response frame 514 over the DS between the AP3 and AP4, e.g., DS 310 (FIG. 3).

In some demonstrative embodiments, as shown in FIG. 5, the FTO 501 may initiate a re-association with the target AP 505, for example, by transmitting a re-association request frame 516 to the target AP 505, for example, directly to AP3 (FIG. 3), e.g., over the second frequency band.

In some demonstrative embodiments, the re-association may be successful, for example, only if a time period between FT authentication request frame 512 and the re-association request frame 516 does not exceed a predefined time period, e.g., a Reassociation Deadline Time.

In some demonstrative embodiments, as shown in FIG. 5, the target AP3 may transmit a re-association response frame 518 to the FTO, for example, over the second frequency band, e.g., in response to the re-association request frame 516.

In some demonstrative embodiments, as shown in FIG. 5, the FTO 501 and the target AP3 may re-associate and may establish a secure session 520 between the FTO 501 and the target AP3, e.g., over the second frequency band.

In some demonstrative embodiments, performing operations of the FT over-the-air protocol, e.g., operations of sequence diagram 400 (FIG. 4), and/or operations of the FT over the DS protocol, e.g., operations of sequence diagram 500 (FIG. 5), may reduce a time in which both a non-DMG radio and/or a DMG radio operate in parallel.

Referring back to FIG. 1, in some demonstrative embodiments, devices 102, 115 and/or 140 may be configured to perform an FT using an MMDE, for example, as described above with reference to FIGS. 2, 3 and/or 4.

In other embodiments, devices 102, 140 and/or 115 may be configured to perform the one or more other additional or alternative operations of FT, for example, to allow an FTO STA, to move from a first AP STA, e.g., the current AP, to a second AP STA, e.g., the target AP, e.g., as described below.

In some demonstrative embodiments, some frames of the over-the air mechanism, for example, frames of type management and subtype authentication, may not be supported in directional networks, e.g., DMG networks, and therefore may not be used in these networks. For example, there may be a problem to have an FT between APs in the DMG network.

In some demonstrative embodiments, in some networks the current AP and the target AP may use the same BSSID. Accordingly, in some implementations, use cases and/or scenarios, it may not be correct and/or necessary to assume, e.g., when using the over-the-air mechanism and/or the over-the-DS mechanism, that there are different BSSIDs between the current AP and the target AP. In one example, an AP may simultaneously support multiple frequency bands, and the FT may be relevant to move between BSSs residing in different bands, e.g., if one of the bands is a directional band, e.g., a 60 GHz band.

There are no known solutions to address at least the above-mentioned issues and/or problems.

In some demonstrative embodiments, an FST Protocol that exploits equal BSSID in different bands may not be able to address BSS transition, e.g., as it may be agnostic to the way the BSS transition is provided.

In some demonstrative embodiments, devices 102, 140 and/or 115 may be configured to generate, process, and/or communicate one or more frames of a type and/or a subtype supported by a directional network, e.g., a DMG network, for example, to communicate one or more FT messages, e.g., as described below.

In some demonstrative embodiments, devices 102, 140 and/or 115 may be configured to generate, process, and/or communicate one or more frames of type management, subtype action, e.g., instead of frames of type management, subtype authentication, for example, to allow a DMG FTO, e.g., device 102, to communicate directly with a target DMG AP, e.g., device 115, to proceed with an FT authentication algorithm, e.g., as described below.

In some demonstrative embodiments, configuring devices 102, 140 and/or 115 to generate, process, and/or communicate the frames of type management, subtype action, e.g., instead of frames of type management, subtype authentication, may allow for example, addressing the problem of the frame formats, which may not be supported in the directional networks, e.g., DMG networks.

In some demonstrative embodiments, devices 102, 140 and/or 115 may be configured to generate, process, and/or communicate one or more messages, for example, FT action frames, including an element, for example, a multi-band element, for example, when the communication between FTO and the target AP is provided via the current AP.

In some demonstrative embodiments, the multi-band element may include a Band ID field to indicate the band on which the target AP resides. This indication may allow, for example, to specifically address the target AP, for example, even if the BSSID of the target AP is equal to the BSSID of the current AP, and/or even in a case when the target AP has equal BSSIDs in more than one band.

In some demonstrative embodiments, using the multi-band element may enable, for example, to allow an FT, e.g., even when the same BSSID is used by the target AP and the current AP, and/or when the target AP uses the same BSSID on more than one band.

Figure 6:
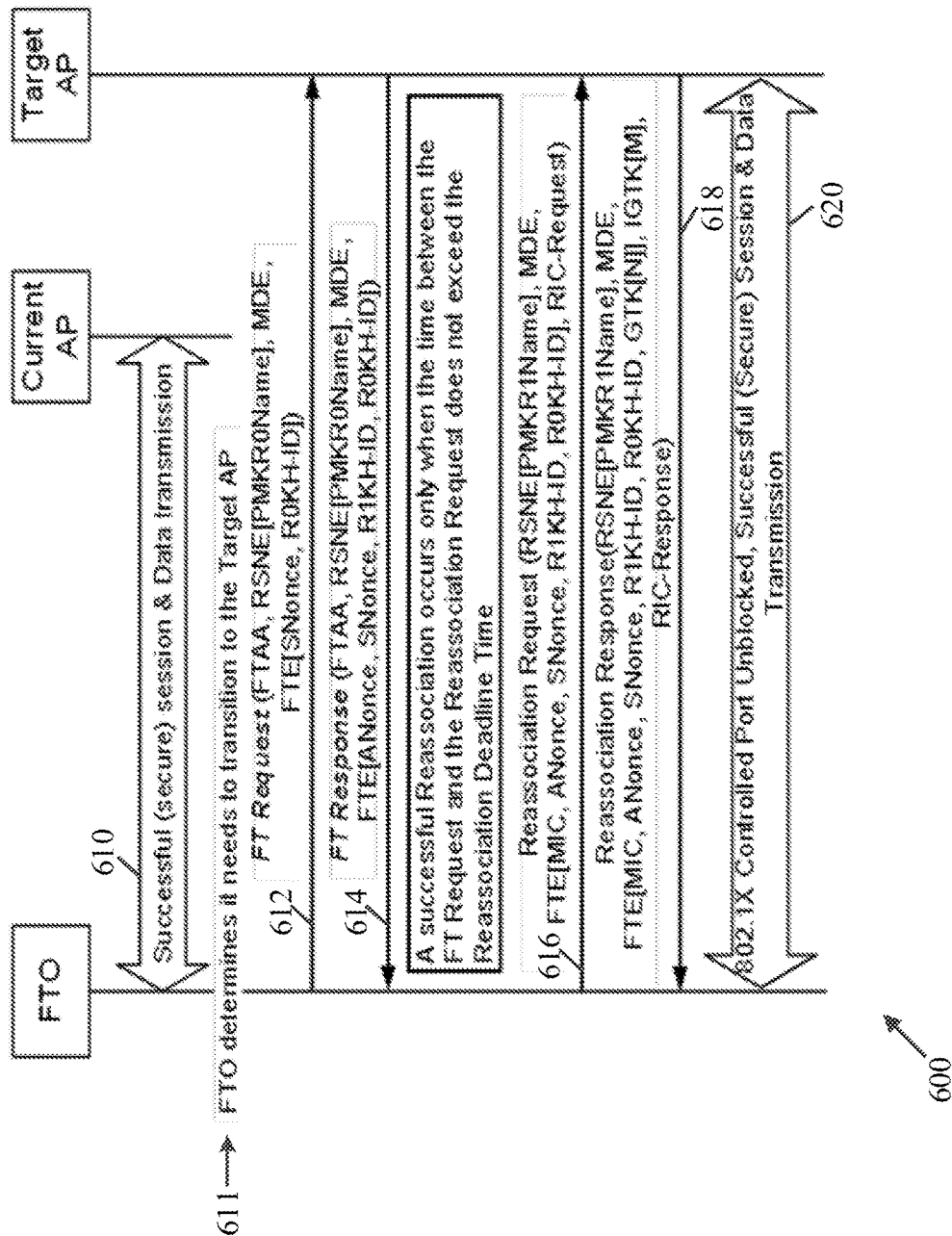
FIG. 6 is a schematic illustration of operations and communications between stations according to an FT protocol, in accordance with some demonstrative embodiments.

Reference is made to FIG. 6, which schematically illustrates a sequence diagram 600 of operations and communications between stations according to an FT protocol, in accordance with some demonstrative embodiments.

In some demonstrative embodiments, one or more of the operations and/or communications of FIG. 6 may be performed, for example, as part of an over-the-air FT protocol, for example, for moving an FTO from a current AP to a target AP.

In some demonstrative embodiments, as shown in FIG. 6, the FTO and the current AP may associate and may establish a secure session 610 between the FTO and the current AP.

In some demonstrative embodiments, the FTO may initiate (611) an FT from a first BSS on the current AP to a second BSS on the target AP.

In some demonstrative embodiments, as shown FIG. 6, one or more FT action frames may be used for over the air FT authentication.

In some demonstrative embodiments, as shown in FIG. 6, an FT authentication request frame 612 may be sent from the FTO to the target AP, and an FT Response frame 614 may be sent from the target AP to the FTO, e.g., in response to the FT Request frame.

In some demonstrative embodiments, the FT authentication request frame 612 may include a Source Address (SA) field of a message header, which shall be set, for example, to a Media Access Control (MAC) address of the FTO.

In some demonstrative embodiments, the FT authentication request frame 612 may include a Destination Address (DA) field of the message header, which shall be set, for example, to the BSSID of the target AP.

In some demonstrative embodiments, as shown in FIG. 6, the FT authentication request frame 612 may include one or more elements with required contents, for example, in accordance with an FT authentication sequence, for example, contents of a first message of the FT authentication sequence, e.g., in accordance with an *IEEE* 802.11 *Specification* ("FT authentication sequence: contents of first message"). The FT authentication request frame 612 may include any other additional or alternative elements.

In some demonstrative embodiments, the FT Response frame 614 may include a SA field of the message header, which shall be set, for example, to the BSSID of the target AP.

In some demonstrative embodiments, the FT Response frame 614 may include a DA field of the message header, which shall be set, for example, to the MAC address of the FTO.

In some demonstrative embodiments, as shown in FIG. 6, the FT Response frame 614 may include one or more elements with required contents, for example, in accordance with an FT authentication sequence, for example, contents of a second message of the FT authentication sequence, e.g., in accordance with an *IEEE* 802.11 *Specification* ("FT authentication sequence: contents of second message"). The FT Response frame 614 may include any other additional or alternative elements.

In some demonstrative embodiments, as shown in FIG. 6, the FTO may initiate a re-association with the target AP, for example, by transmitting a re-association request frame 616 to the target AP.

In some demonstrative embodiments, the re-association may be successful, for example, only if a time period between FT request frame 612 and the re-association request frame 616 does not exceed a predefined time period, e.g., Reassociation Deadline Time.

In some demonstrative embodiments, as shown in FIG. 6, the target AP may transmit a re-association response frame 618 to the FTO, e.g., in response to the re-association request frame 616.

In some demonstrative embodiments, as shown in FIG. 6, the FTO and the target AP may re-associate and may establish a secure session 620 between the FTO and the target AP1, e.g., over the same frequency band.

Figure 7:
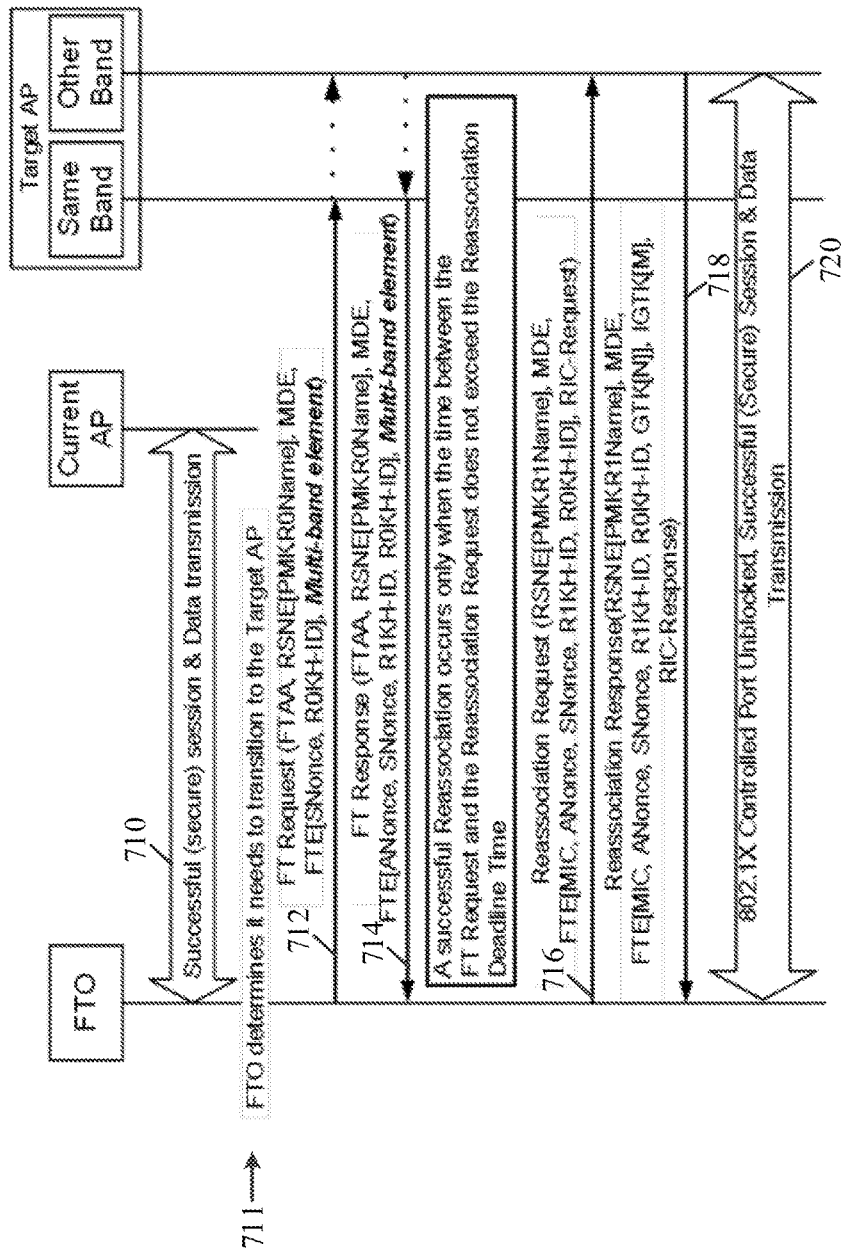
FIG. 7 is a schematic illustration of operations and communications between stations according to an FT protocol, in accordance with some demonstrative embodiments.

Reference is made to FIG. 7, which schematically illustrates a sequence diagram 700 of operations and communications between stations according to an FT protocol, in accordance with some demonstrative embodiments.

In some demonstrative embodiments, one or more of the operations and/or communications of FIG. 7 may be performed, for example, as part of an over-the-air FT protocol, for example, for moving an FTO between a current AP and a target AP, for example, for different bands.

In some demonstrative embodiments, one or more of the operations and/or communications described below with respect to FIG. 7 may be performed, for example, as part of an over-the-DS FT protocol, for example, for moving an FTO between a current AP and a target AP, for example, for different bands.

In some demonstrative embodiments, one or more of the operations and/or communications of FIG. 7 may be performed, for example, for moving an FTO, from a first frequency band ("Same Band") of a current AP, to a second frequency band ("Other Band") of the target AP.

In some demonstrative embodiments, as shown in FIG. 7, the FTO and the current AP may associate and may establish a secure session 710 between the FTO and the current AP.

In some demonstrative embodiments, the FTO may initiate (711) an FT to transition from a first BSS of the current AP over the first frequency band to a second BSS of the target AP over the second frequency band.

In some demonstrative embodiments, as shown FIG. 7, one or more FT action frames may be used for over the air FT authentication.

In some demonstrative embodiments, as shown in FIG. 7, an FT authentication request frame 712 may be sent from the FTO to the target AP, and an FT Response frame 714 may be sent from the target AP to the FTO, e.g., in response to the FT Request frame.

In some demonstrative embodiments, the FT authentication request frame 712 and/or the FT Response frame 714 may include one or more elements and/or contents, e.g., as described above with reference to FIG. 6.

In some demonstrative embodiments, one or more of the operations and/or communications of FIG. 7 may be performed, for example, as part of an FT protocol to provide fast BSS transition to the target AP, which may have, for example, the same BSSIDs in two different bands.

In some demonstrative embodiments, the FTO may communicate FT frames with the Target AP, for example, in a band of the current AP.

In some demonstrative embodiments, as shown in FIG. 7, a Multi-band element may be used to communicate an indication of a band from the FTO to the target AP, and/or to deliver an indication of the actual channel of an other band that the Target AP operates on back to the FTO.

In some demonstrative embodiments, Re-association may occur in the other band in which the FTO may operate after re-association.

In some demonstrative embodiments, one or more of the operations and/or communications of FIG. 7 may be performed, for example, as part of fast BSS transition to the target AP, which may support more than one band and may have different BSSID's in different bands. For example, in this case, the BSSID field of the multi-band element may be configured to indicate the AP address in the band to which the FTO transits.

In some demonstrative embodiments, one or more of the operations and/or communications described above with respect to FIG. 7 may be performed, for example, as part of an over-the-DS FT protocol, for example, for moving an FTO between a current AP and a target AP, for example, for different bands.

For example, the Multi-band element may be used, e.g., as described above, for an FT protocol Over-the-DS.

In some demonstrative embodiments, using FT action frames in DMG networks, e.g., as discussed above, may be applicable for one or more additional protocols, for example, one or more other FT protocols, e.g., at least an FT resource request protocol.

In some demonstrative embodiments, one or more frames of type management, subtype action, e.g., as described above, may be defined according to an "Action field" mechanism, which may allow specifying extended management actions, e.g., in accordance with an *IEEE* 802.11 *Specification*, and/or any other specification.

In some demonstrative embodiments, the action field may include a category field, which may be set to a code to indicate an action frame type. For example, the category field may be set to a code "6" to indicate a Fast BSS transition Action frame.

In some demonstrative embodiments, the action field may include an action details field, which may contain details of the action. The details of the action allowed in a category may be defined, for example, according to a Category values table.

In some demonstrative embodiments, a robustness ("Robust") setting in the Category values table with respect to the Fast BSS transition Action frame category may be defined and/or configured, for example, to make the FT frames applicable for over-the-air protocol in DMG networks, e.g., as follows:

TABLE 2

Robustness for FT action frame

| Code | Meaning | See subclause | Robust | Group addressed privacy |
|---|---|---|---|---|
| 6 | Fast BSS transition | 9.6.9 (FT action frame details) | — See NOTE xx | No |

NOTE xx - Fast BSS transition frames are robust, except for the frames are used in Over-the-air FT protocol and in Over-the-air FT resource request protocol in a DMG BSS.

For example, according to Table 2, the FT frames may be defined as robust, e.g., "protected", for example, except for FT frames to be used in Over-the-air FT protocol and in Over-the-air FT resource request protocol in a DMG BSS, which may be defined as non-robust, e.g., "unprotected".

In some demonstrative embodiments, a Fast BSS transition protocol in DMG network may be supported, for example, by extending an existent category of Unprotected DMG action frames, for example, with one or more new frames, which may be, for example, configured for Fast BSS transition in DMG network, e.g., as follows:

TABLE 3

Extension of Unprotected DMG action frames

| Unprotected DMG Action field value | Meaning |
| --- | --- |
| 0 | Existent |
| 1 | Existent |
| X1 | DMG FT Request frame |
| X2 | DMG FT Response frame |
| X3 | DMG FT Confirm frame |
| X4 | DMG FT Ack frame |

In some demonstrative embodiments, a content of the new presented frames, e.g., according to Table 3, may include, e.g., may be equal to, the content of one or more FT frames, for example, existent FT Request, FT Response, FT Confirm and/or FT Ack frames.

In some demonstrative embodiments, the Multi-band element, e.g., as described above, may be added to one or more of the new frames, e.g., to each of the new defined frames.

Figure 8:
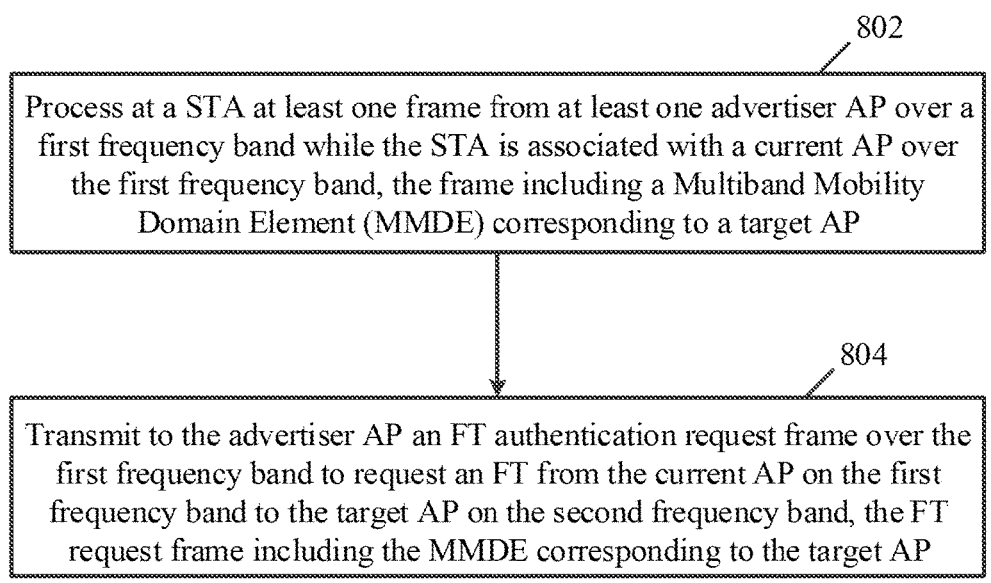
FIG. 8 is a schematic flow-chart illustration of a method of an FT, in accordance with some demonstrative embodiments.

Reference is made to FIG. 8, which schematically illustrates a method of FT, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 802, the method may include processing at a STA at least one frame from at least one advertiser AP over a first frequency band while the STA is associated with a current AP over the first frequency band, the frame including a MMDE corresponding to a target AP. For example, controller 124 (FIG. 1) may control, cause and/or trigger device 102 (FIG. 1) to process a frame received from device 140 (FIG. 1) including the MMDE 200 (FIG. 2) while device 102 (FIG. 1) is associated with device 140 (FIG. 1) over the first frequency band, e.g., as described above.

As indicated at block 804, the method may include transmitting to the advertiser AP an FT authentication request frame over the first frequency band to request an FT from the current AP on the first frequency band to the target AP on the second frequency band, the FT request frame including the MMDE corresponding to the target AP. For example, controller 124 (FIG. 1) may control, cause and/or trigger device 102 (FIG. 1) to transmit to device 140 (FIG. 1) the FT authentication request frame including the MMDE 200 (FIG. 2) over the first frequency band to request the FT from the current AP on the first frequency band to the target AP on the second frequency band, e.g., as described above.

Figure 9:
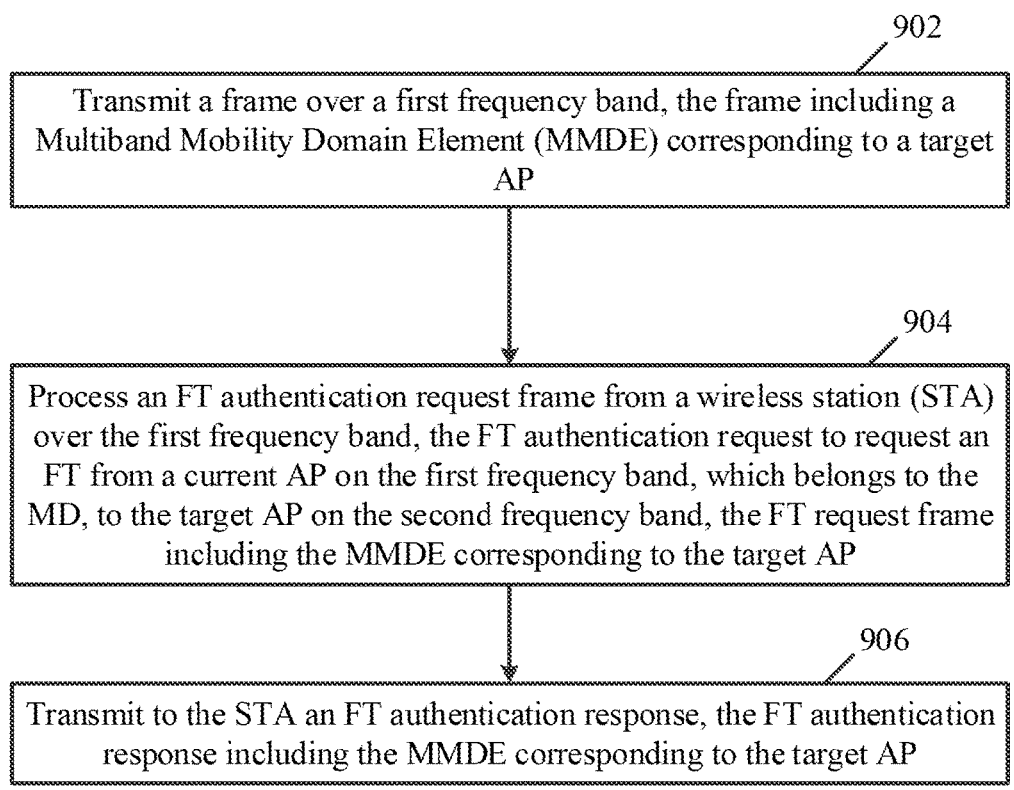
FIG. 9 is a schematic flow-chart illustration of a method of an FT, in accordance with some demonstrative embodiments.

Reference is made to FIG. 9, which schematically illustrates a method of FT, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 902, the method may include transmitting from an advertiser AP a frame over a first frequency band, the frame including an MMDE corresponding to a target AP. For example, controller 154 (FIG. 1) may control, cause and/or trigger device 140 (FIG. 1) a frame, e.g., a beacon or a probe response, including the MMDE 200 (FIG. 2) corresponding to a target AP, e.g., as described above.

As indicated at block 904, the method may include processing an FT authentication request frame from a STA over the first frequency band, the FT authentication request to request an FT from a current AP on the first frequency band, to the target AP on the second frequency band, the FT request frame including the MMDE corresponding to the target AP. For example, controller 154 (FIG. 1) may control, cause and/or trigger device 140 (FIG. 1) to process the FT authentication request frame from device 102 (FIG. 1) over the first frequency band (FIG. 1), the FT authentication request frame including the MMDE 200 (FIG. 2) to request the FT from the current AP on the first frequency band, to the target AP on the second frequency band, e.g., as described above.

As indicated at block 906, the method may include transmitting to the STA an FT authentication response, the FT authentication response including the MMDE corresponding to the target AP. For example, controller 154 (FIG. 1) may control, cause and/or trigger device 140 (FIG. 1) to transmit to device 102 (FIG. 1) the FT authentication response including the MMDE corresponding to the target AP, e.g., as described above.

Figure 10:
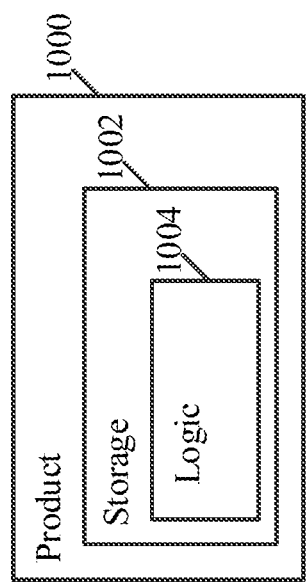
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities described above with reference to FIGS. 1, 2, 3, 4, 5, 6, 7, 8, and/or 9, and/or one or more operations described herein. The phrase "non-transitory machine-readable medium" is directed to include all computer-readable media, with the sole exception being a transitory propagating signal.

In some demonstrative embodiments, product 1000 and/or storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE- PROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station (STA) to process at least one frame from at least one advertiser Access Point (AP) over a first frequency band while the STA is associated with a current AP over the first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the current AP, the advertiser AP, and the target AP belong, and a Fast BSS Transition (FT) field comprising FT information corresponding to the target AP; and transmit to the advertiser AP an FT authentication request frame over the first frequency band to request an FT from the current AP on the first frequency band to the target AP on the second frequency band, the FT authentication request frame comprising the MMDE corresponding to the target AP.

Example 2 includes the subject matter of Example 1, and optionally, wherein the apparatus is configured to cause the STA to process an FT authentication response from the advertiser AP, the FT authentication response comprising the MMDE corresponding to the target AP.

Example 3 includes the subject matter of Example 2, and optionally, wherein the apparatus is configured to cause the STA to re-associate with the target AP over the second frequency band based on the FT authentication response.

Example 4 includes the subject matter of any one of Examples 1-3, and optionally, wherein the FT field comprises an FT capability and policy field comprising an FT over a Distribution System (DS) field, and a resource request protocol capability field.

Example 5 includes the subject matter of any one of Examples 1-4, and optionally, wherein the MMDE comprises a channel ID of a channel to communicate with the target AP over the second frequency band.

Example 6 includes the subject matter of any one of Examples 1-5, and optionally, wherein the advertiser AP comprises the current AP.

Example 7 includes the subject matter of any one of Examples 1-5, and optionally, wherein the advertiser AP is different from the current AP.

Example 8 includes the subject matter of any one of Examples 1-7, and optionally, wherein the advertiser AP comprises the target AP, the FT comprises an over-the-air FT.

Example 9 includes the subject matter of any one of Examples 1-7, and optionally, wherein the target AP is different from the advertiser AP, the FT comprises an FT over a Distribution System (DS) between the advertiser AP and the target AP.

Example 10 includes the subject matter of any one of Examples 1-9, and optionally, wherein one of the first and second frequency bands comprises a directional frequency band, and another one of the first and second frequency bands comprises a non-directional frequency band.

Example 11 includes the subject matter of any one of Examples 1-10, and optionally, wherein one of the first and second frequency bands comprises a Directional Multi-Gigabit (DMG) band, and another one of the first and second frequency bands comprises a non-DMG band.

Example 12 includes the subject matter of any one of Examples 1-11, and optionally, wherein the frame comprises a beacon frame or a probe response frame.

Example 13 includes the subject matter of any one of Examples 1-12, and optionally, comprising one or more directional antennas, a memory, and a processor.

Example 14 includes a system of wireless communication comprising an apparatus of a wireless station (STA), the apparatus comprising one or more directional antennas; a memory; a processor; and a controller configured to cause the STA to process at least one frame from at least one advertiser Access Point (AP) over a first frequency band while the STA is associated with a current AP over the first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the current AP, the advertiser AP, and the target AP belong, and a Fast BSS Transition (FT) field comprising FT information corresponding to the target AP; and transmit to the advertiser AP an FT authentication request frame over the first frequency band to request an FT from the current AP on the first frequency band to the target AP on the second frequency band, the FT authentication request frame comprising the MMDE corresponding to the target AP.

Example 15 includes the subject matter of Example 14, and optionally, wherein the controller is configured to cause the STA to process an FT authentication response from the advertiser AP, the FT authentication response comprising the MMDE corresponding to the target AP.

Example 16 includes the subject matter of Example 15, and optionally, wherein the controller is configured to cause the STA to re-associate with the target AP over the second frequency band based on the FT authentication response.

Example 17 includes the subject matter of any one of Examples 14-16, and optionally, wherein the FT field comprises an FT capability and policy field comprising an FT over a Distribution System (DS) field, and a resource request protocol capability field.

Example 18 includes the subject matter of any one of Examples 14-17, and optionally, wherein the MMDE comprises a channel ID of a channel to communicate with the target AP over the second frequency band.

Example 19 includes the subject matter of any one of Examples 14-18, and optionally, wherein the advertiser AP comprises the current AP.

Example 20 includes the subject matter of any one of Examples 14-18, and optionally, wherein the advertiser AP is different from the current AP.

Example 21 includes the subject matter of any one of Examples 14-20, and optionally, wherein the advertiser AP comprises the target AP, the FT comprises an over-the-air FT.

Example 22 includes the subject matter of any one of Examples 14-20, and optionally, wherein the target AP is different from the advertiser AP, the FT comprises an FT over a Distribution System (DS) between the advertiser AP and the target AP.

Example 23 includes the subject matter of any one of Examples 14-22, and optionally, wherein one of the first and second frequency bands comprises a directional frequency band, and another one of the first and second frequency bands comprises a non-directional frequency band.

Example 24 includes the subject matter of any one of Examples 14-23, and optionally, wherein one of the first and second frequency bands comprises a Directional Multi-Gigabit (DMG) band, and another one of the first and second frequency bands comprises a non-DMG band.

Example 25 includes the subject matter of any one of Examples 14-24, and optionally, wherein the frame comprises a beacon frame or a probe response frame.

Example 26 includes a method to be performed at a wireless station (STA), the method comprising processing at least one frame from at least one advertiser Access Point (AP) over a first frequency band while the STA is associated with a current AP over the first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the current AP, the advertiser AP, and the target AP belong, and a Fast BSS Transition (FT) field comprising FT information corresponding to the target AP; and transmitting to the advertiser AP an FT authentication request frame over the first frequency band to request an FT from the current AP on the first frequency band to the target AP on the second frequency band, the FT authentication request frame comprising the MMDE corresponding to the target AP.

Example 27 includes the subject matter of Example 26, and optionally, comprising processing an FT authentication response from the advertiser AP, the FT authentication response comprising the MMDE corresponding to the target AP.

Example 28 includes the subject matter of Example 27, and optionally, comprising re-associating with the target AP over the second frequency band based on the FT authentication response.

Example 29 includes the subject matter of any one of Examples 26-28, and optionally, wherein the FT field comprises an FT capability and policy field comprising an FT over a Distribution System (DS) field, and a resource request protocol capability field.

Example 30 includes the subject matter of any one of Examples 26-29, and optionally, wherein the MMDE comprises a channel ID of a channel to communicate with the target AP over the second frequency band.

Example 31 includes the subject matter of any one of Examples 26-30, and optionally, wherein the advertiser AP comprises the current AP.

Example 32 includes the subject matter of any one of Examples 26-30, and optionally, wherein the advertiser AP is different from the current AP.

Example 33 includes the subject matter of any one of Examples 26-32, and optionally, wherein the advertiser AP comprises the target AP, the FT comprises an over-the-air FT.

Example 34 includes the subject matter of any one of Examples 26-32, and optionally, wherein the target AP is different from the advertiser AP, the FT comprises an FT over a Distribution System (DS) between the advertiser AP and the target AP.

Example 35 includes the subject matter of any one of Examples 26-34, and optionally, wherein one of the first and second frequency bands comprises a directional frequency band, and another one of the first and second frequency bands comprises a non-directional frequency band.

Example 36 includes the subject matter of any one of Examples 26-35, and optionally, wherein one of the first and second frequency bands comprises a Directional Multi-Gigabit (DMG) band, and another one of the first and second frequency bands comprises a non-DMG band.

Example 37 includes the subject matter of any one of Examples 26-36, and optionally, wherein the frame comprises a beacon frame or a probe response frame.

Example 38 includes a product comprising one or more tangible computer-readable non-transitory storage media comprising computer-executable instructions operable to, when executed by at least one computer processor, enable the at least one computer processor to implement operations at a wireless station (STA), the operations comprising processing at least one frame from at least one advertiser Access Point (AP) over a first frequency band while the STA is associated with a current AP over the first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the current AP, the advertiser AP, and the target AP belong, and a Fast BSS Transition (FT) field comprising FT information corresponding to the target AP; and transmitting to the advertiser AP an FT authentication request frame over the first frequency band to request an FT from the current AP on the first frequency band to the target AP on the second frequency band, the FT authentication request frame comprising the MMDE corresponding to the target AP.

Example 39 includes the subject matter of Example 38, and optionally, wherein the operations comprise processing an FT authentication response from the advertiser AP, the FT authentication response comprising the MMDE corresponding to the target AP.

Example 40 includes the subject matter of Example 39, and optionally, wherein the operations comprise re-associating with the target AP over the second frequency band based on the FT authentication response.

Example 41 includes the subject matter of any one of Examples 38-40, and optionally, wherein the FT field comprises an FT capability and policy field comprising an FT over a Distribution System (DS) field, and a resource request protocol capability field.

Example 42 includes the subject matter of any one of Examples 38-41, and optionally, wherein the MMDE comprises a channel ID of a channel to communicate with the target AP over the second frequency band.

Example 43 includes the subject matter of any one of Examples 38-42, and optionally, wherein the advertiser AP comprises the current AP.

Example 44 includes the subject matter of any one of Examples 38-42, and optionally, wherein the advertiser AP is different from the current AP.

Example 45 includes the subject matter of any one of Examples 38-44, and optionally, wherein the advertiser AP comprises the target AP, the FT comprises an over-the-air FT.

Example 46 includes the subject matter of any one of Examples 38-44, and optionally, wherein the target AP is different from the advertiser AP, the FT comprises an FT over a Distribution System (DS) between the advertiser AP and the target AP.

Example 47 includes the subject matter of any one of Examples 38-46, and optionally, wherein one of the first and second frequency bands comprises a directional frequency band, and another one of the first and second frequency bands comprises a non-directional frequency band.

Example 48 includes the subject matter of any one of Examples 38-47, and optionally, wherein one of the first and second frequency bands comprises a Directional Multi-Gigabit (DMG) band, and another one of the first and second frequency bands comprises a non-DMG band.

Example 49 includes the subject matter of any one of Examples 38-48, and optionally, wherein the frame comprises a beacon frame or a probe response frame.

Example 50 includes an apparatus of a wireless station (STA), the apparatus comprising means for processing at least one frame from at least one advertiser Access Point (AP) over a first frequency band while the STA is associated with a current AP over the first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the current AP, the advertiser AP, and the target AP belong, and a Fast BSS Transition (FT) field comprising FT information corresponding to the target AP; and means for transmitting to the advertiser AP an FT authentication request frame over the first frequency band to request an FT from the current AP on the first frequency band to the target AP on the second frequency band, the FT authentication request frame comprising the MMDE corresponding to the target AP.

Example 51 includes the subject matter of Example 50, and optionally, comprising means for processing an FT authentication response from the advertiser AP, the FT authentication response comprising the MMDE corresponding to the target AP.

Example 52 includes the subject matter of Example 51, and optionally, comprising means for re-associating with the target AP over the second frequency band based on the FT authentication response.

Example 53 includes the subject matter of any one of Examples 50-52, and optionally, wherein the FT field comprises an FT capability and policy field comprising an FT over a Distribution System (DS) field, and a resource request protocol capability field.

Example 54 includes the subject matter of any one of Examples 50-53, and optionally, wherein the MMDE comprises a channel ID of a channel to communicate with the target AP over the second frequency band.

Example 55 includes the subject matter of any one of Examples 50-54, and optionally, wherein the advertiser AP comprises the current AP.

Example 56 includes the subject matter of any one of Examples 50-54, and optionally, wherein the advertiser AP is different from the current AP.

Example 57 includes the subject matter of any one of Examples 50-56, and optionally, wherein the advertiser AP comprises the target AP, the FT comprises an over-the-air FT.

Example 58 includes the subject matter of any one of Examples 50-56, and optionally, wherein the target AP is different from the advertiser AP, the FT comprises an FT over a Distribution System (DS) between the advertiser AP and the target AP.

Example 59 includes the subject matter of any one of Examples 50-58, and optionally, wherein one of the first and second frequency bands comprises a directional frequency band, and another one of the first and second frequency bands comprises a non-directional frequency band.

Example 60 includes the subject matter of any one of Examples 50-59, and optionally, wherein one of the first and second frequency bands comprises a Directional Multi-Gigabit (DMG) band, and another one of the first and second frequency bands comprises a non-DMG band.

Example 61 includes the subject matter of any one of Examples 50-60, and optionally, wherein the frame comprises a beacon frame or a probe response frame.

Example 62 includes an apparatus comprising logic and circuitry configured to cause an advertiser Access Point (AP) to transmit a frame over a first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the advertiser AP and the target AP belong, and a Fast BSS Transition (FT) field comprising FT information corresponding to the target AP; process an FT authentication request frame from a wireless station (STA) over the first frequency band, the FT authentication request to request an FT from a current AP on the first frequency band, which belongs to the MD, to the target AP on the second frequency band, the FT authentication request frame comprising the MMDE corresponding to the target AP; and transmit to the STA an FT authentication response, the FT authentication response comprising the MMDE corresponding to the target AP.

Example 63 includes the subject matter of Example 62, and optionally, wherein the FT field comprises an FT capability and policy field comprising an FT over a Distribution System (DS) field, and a resource request protocol capability field.

Example 64 includes the subject matter of Example 62 or 63, and optionally, wherein the MMDE comprises a channel ID of a channel to communicate with the target AP over the second frequency band.

Example 65 includes the subject matter of any one of Examples 62-64, and optionally, wherein the advertiser AP comprises the current AP.

Example 66 includes the subject matter of any one of Examples 62-64, and optionally, wherein the advertiser AP is different from the current AP.

Example 67 includes the subject matter of any one of Examples 62-66, and optionally, wherein the advertiser AP comprises the target AP, the FT comprises an over-the-air FT.

Example 68 includes the subject matter of any one of Examples 62-66, and optionally, wherein the target AP is different from the advertiser AP, the FT comprises an FT over a Distribution System (DS) between the advertiser AP and the target AP.

Example 69 includes the subject matter of any one of Examples 62-68, and optionally, wherein one of the first and second frequency bands comprises a directional frequency band, and another one of the first and second frequency bands comprises a non-directional frequency band.

Example 70 includes the subject matter of any one of Examples 62-69, and optionally, wherein one of the first and second frequency bands comprises a Directional Multi-Gigabit (DMG) band, and another one of the first and second frequency bands comprises a non-DMG band.

Example 71 includes the subject matter of any one of Examples 62-70, and optionally, wherein the frame comprises a beacon frame or a probe response frame.

Example 72 includes the subject matter of any one of Examples 62-71, and optionally, comprising one or more directional antennas, a memory, and a processor.

Example 73 includes a system of wireless communication comprising an apparatus of an advertiser Access Point (AP), the apparatus comprising one or more directional antennas; a memory; a processor; and a controller configured to cause the advertiser AP to transmit a frame over a first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the advertiser AP and the target AP belong, and a Fast BSS Transition (FT) field comprising FT information corresponding to the target AP; process an FT authentication request frame from a wireless station (STA) over the first frequency band, the FT authentication request to request an FT from a current AP on the first frequency band, which belongs to the MD, to the target AP on the second frequency band, the FT authentication request frame comprising the MMDE corresponding to the target AP; and transmit to the STA an FT authentication response, the FT authentication response comprising the MMDE corresponding to the target AP.

Example 74 includes the subject matter of Example 73, and optionally, wherein the FT field comprises an FT capability and policy field comprising an FT over a Distribution System (DS) field, and a resource request protocol capability field.

Example 75 includes the subject matter of Example 73 or 74, and optionally, wherein the MMDE comprises a channel ID of a channel to communicate with the target AP over the second frequency band.

Example 76 includes the subject matter of any one of Examples 73-75, and optionally, wherein the advertiser AP comprises the current AP.

Example 77 includes the subject matter of any one of Examples 73-75, and optionally, wherein the advertiser AP is different from the current AP.

Example 78 includes the subject matter of any one of Examples 73-77, and optionally, wherein the advertiser AP comprises the target AP, the FT comprises an over-the-air FT.

Example 79 includes the subject matter of any one of Examples 73-77, and optionally, wherein the target AP is different from the advertiser AP, the FT comprises an FT over a Distribution System (DS) between the advertiser AP and the target AP.

Example 80 includes the subject matter of any one of Examples 73-79, and optionally, wherein one of the first and second frequency bands comprises a directional frequency band, and another one of the first and second frequency bands comprises a non-directional frequency band.

Example 81 includes the subject matter of any one of Examples 73-80, and optionally, wherein one of the first and second frequency bands comprises a Directional Multi-Gigabit (DMG) band, and another one of the first and second frequency bands comprises a non-DMG band.

Example 82 includes the subject matter of any one of Examples 73-81, and optionally, wherein the frame comprises a beacon frame or a probe response frame.

Example 83 includes a method to be performed at an advertiser Access Point (AP), the method comprising transmitting a frame over a first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the advertiser AP and the target AP belong, and a Fast BSS Transition (FT) field comprising FT information corresponding to the target AP; processing an FT authentication request frame from a wireless station (STA) over the first frequency band, the FT authentication request to request an FT from a current AP on the first frequency band, which belongs to the MD, to the target AP on the second frequency band, the FT authentication request frame comprising the MMDE corresponding to the target AP; and transmitting to the STA an FT authentication response, the FT authentication response comprising the MMDE corresponding to the target AP.

Example 84 includes the subject matter of Example 83, and optionally, wherein the FT field comprises an FT capability and policy field comprising an FT over a Distribution System (DS) field, and a resource request protocol capability field.

Example 85 includes the subject matter of Example 83 or 84, and optionally, wherein the MMDE comprises a channel ID of a channel to communicate with the target AP over the second frequency band.

Example 86 includes the subject matter of any one of Examples 83-85, and optionally, wherein the advertiser AP comprises the current AP.

Example 87 includes the subject matter of any one of Examples 83-85, and optionally, wherein the advertiser AP is different from the current AP.

Example 88 includes the subject matter of any one of Examples 83-87, and optionally, wherein the advertiser AP comprises the target AP, the FT comprises an over-the-air FT.

Example 89 includes the subject matter of any one of Examples 83-87, and optionally, wherein the target AP is different from the advertiser AP, the FT comprises an FT over a Distribution System (DS) between the advertiser AP and the target AP.

Example 90 includes the subject matter of any one of Examples 83-89, and optionally, wherein one of the first and second frequency bands comprises a directional frequency band, and another one of the first and second frequency bands comprises a non-directional frequency band.

Example 91 includes the subject matter of any one of Examples 83-90, and optionally, wherein one of the first and second frequency bands comprises a Directional Multi-Gigabit (DMG) band, and another one of the first and second frequency bands comprises a non-DMG band.

Example 92 includes the subject matter of any one of Examples 83-91, and optionally, wherein the frame comprises a beacon frame or a probe response frame.

Example 93 includes a product comprising one or more tangible computer-readable non-transitory storage media comprising computer-executable instructions operable to, when executed by at least one computer processor, enable the at least one computer processor to implement operations at an advertiser Access Point (AP), the operations comprising transmitting a frame over a first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the advertiser AP and the target AP belong, and a Fast BSS Transition (FT) field comprising FT information corresponding to the target AP; processing an FT authentication request frame from a wireless station (STA) over the first frequency band, the FT authentication request to request an FT from a current AP on the first frequency band, which belongs to the MD, to the target AP on the second frequency band, the FT authentication request frame comprising the MMDE corresponding to the target AP; and transmitting to the STA an FT authentication response, the FT authentication response comprising the MMDE corresponding to the target AP.

Example 94 includes the subject matter of Example 93, and optionally, wherein the FT field comprises an FT capability and policy field comprising an FT over a Distribution System (DS) field, and a resource request protocol capability field.

Example 95 includes the subject matter of Example 93 or 94, and optionally, wherein the MMDE comprises a channel ID of a channel to communicate with the target AP over the second frequency band.

Example 96 includes the subject matter of any one of Examples 93-95, and optionally, wherein the advertiser AP comprises the current AP.

Example 97 includes the subject matter of any one of Examples 93-95, and optionally, wherein the advertiser AP is different from the current AP.

Example 98 includes the subject matter of any one of Examples 93-97, and optionally, wherein the advertiser AP comprises the target AP, the FT comprises an over-the-air FT.

Example 99 includes the subject matter of any one of Examples 93-97, and optionally, wherein the target AP is different from the advertiser AP, the FT comprises an FT over a Distribution System (DS) between the advertiser AP and the target AP.

Example 100 includes the subject matter of any one of Examples 93-99, and optionally, wherein one of the first and second frequency bands comprises a directional frequency band, and another one of the first and second frequency bands comprises a non-directional frequency band.

Example 101 includes the subject matter of any one of Examples 93-100, and optionally, wherein one of the first and second frequency bands comprises a Directional Multi-Gigabit (DMG) band, and another one of the first and second frequency bands comprises a non-DMG band.

Example 102 includes the subject matter of any one of Examples 93-101, and optionally, wherein the frame comprises a beacon frame or a probe response frame.

Example 103 includes an apparatus of an advertiser Access Point (AP), the apparatus comprising means for transmitting a frame over a first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the advertiser AP and the target AP belong, and a Fast BSS Transition (FT) field comprising FT information corresponding to the target AP; means for processing an FT authentication request frame from a wireless station (STA) over the first frequency band, the FT authentication request to request an FT from a current AP on the first frequency band, which belongs to the MD, to the target AP on the second frequency band, the FT authentication request frame comprising the MMDE corresponding to the target AP; and means for transmitting to the STA an FT authentication response, the FT authentication response comprising the MMDE corresponding to the target AP.

Example 104 includes the subject matter of Example 103, and optionally, wherein the FT field comprises an FT capability and policy field comprising an FT over a Distribution System (DS) field, and a resource request protocol capability field.

Example 105 includes the subject matter of Example 103 or 104, and optionally, wherein the MMDE comprises a channel ID of a channel to communicate with the target AP over the second frequency band.

Example 106 includes the subject matter of any one of Examples 103-105, and optionally, wherein the advertiser AP comprises the current AP.

Example 107 includes the subject matter of any one of Examples 103-105, and optionally, wherein the advertiser AP is different from the current AP.

Example 108 includes the subject matter of any one of Examples 103-107, and optionally, wherein the advertiser AP comprises the target AP, the FT comprises an over-the-air FT.

Example 109 includes the subject matter of any one of Examples 103-107, and optionally, wherein the target AP is different from the advertiser AP, the FT comprises an FT over a Distribution System (DS) between the advertiser AP and the target AP.

Example 110 includes the subject matter of any one of Examples 103-109, and optionally, wherein one of the first and second frequency bands comprises a directional frequency band, and another one of the first and second frequency bands comprises a non-directional frequency band.

Example 111 includes the subject matter of any one of Examples 103-110, and optionally, wherein one of the first and second frequency bands comprises a Directional Multi-Gigabit (DMG) band, and another one of the first and second frequency bands comprises a non-DMG band.

Example 112 includes the subject matter of any one of Examples 103-111, and optionally, wherein the frame comprises a beacon frame or a probe response frame.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station (STA) to:
   process at least one frame from at least one advertiser Access Point (AP) over a first frequency band while the STA is associated with a current AP over the first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the current AP, the advertiser AP, and the target AP belong, and a Fast BSS Transition (FT) field comprising FT information corresponding to the target AP; and
   transmit to the advertiser AP an FT authentication request frame over the first frequency band to request an FT from the current AP on the first frequency band to the target AP on the second frequency band, the FT authentication request frame comprising the MMDE corresponding to the target AP.

2. The apparatus of claim 1 configured to cause the STA to process an FT authentication response from the advertiser AP, the FT authentication response comprising the MMDE corresponding to the target AP.

3. The apparatus of claim 2 configured to cause the STA to re-associate with the target AP over the second frequency band based on the FT authentication response.

4. The apparatus of claim 1, wherein the FT field comprises an FT capability and policy field comprising an FT over a Distribution System (DS) field, and a resource request protocol capability field.

5. The apparatus of claim 1, wherein the MMDE comprises a channel ID of a channel to communicate with the target AP over the second frequency band.

6. The apparatus of claim 1, wherein the advertiser AP comprises the current AP.

7. The apparatus of claim 1, wherein the advertiser AP is different from the current AP.

8. The apparatus of claim 1, wherein the advertiser AP comprises the target AP, the FT comprises an over-the-air FT.

9. The apparatus of claim 1, wherein the target AP is different from the advertiser AP, the FT comprises an FT over a Distribution System (DS) between the advertiser AP and the target AP.

10. The apparatus of claim 1, wherein one of the first and second frequency bands comprises a directional frequency band, and another one of the first and second frequency bands comprises a non-directional frequency band.

11. The apparatus of claim 1, wherein the frame comprises a beacon frame or a probe response frame.

12. The apparatus of claim 1 comprising one or more directional antennas, a memory, and a processor.

13. A product comprising one or more tangible computer-readable non-transitory storage media comprising computer-executable instructions operable to, when executed by at least one computer processor, enable the at least one computer processor to implement operations at a wireless station (STA), the operations comprising:
    processing at least one frame from at least one advertiser Access Point (AP) over a first frequency band while the STA is associated with a current AP over the first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the current AP, the advertiser AP, and the target AP belong, and a Fast BSS Transition (FT) field comprising FT information corresponding to the target AP; and
    transmitting to the advertiser AP an FT authentication request frame over the first frequency band to request an FT from the current AP on the first frequency band to the target AP on the second frequency band, the FT authentication request frame comprising the MMDE corresponding to the target AP.

14. The product of claim 13, wherein the operations comprise processing an FT authentication response from the advertiser AP, the FT authentication response comprising the MMDE corresponding to the target AP.

15. An apparatus comprising logic and circuitry configured to cause an advertiser Access Point (AP) to:
    transmit a frame over a first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the advertiser AP and the target AP belong, and a Fast BSS Transition (FT) field comprising FT information corresponding to the target AP;
    process an FT authentication request frame from a wireless station (STA) over the first frequency band, the FT authentication request frame to request an FT from a current AP on the first frequency band, which belongs to the MD, to the target AP on the second frequency band, the FT authentication request frame comprising the MMDE corresponding to the target AP; and
    transmit to the STA an FT authentication response, the FT authentication response comprising the MMDE corresponding to the target AP.

16. The apparatus of claim 15, wherein the FT field comprises an FT capability and policy field comprising an FT over a Distribution System (DS) field, and a resource request protocol capability field.

17. The apparatus of claim 15, wherein the MMDE comprises a channel ID of a channel to communicate with the target AP over the second frequency band.

18. The apparatus of claim 15, wherein the advertiser AP comprises the current AP.

19. The apparatus of claim 15, wherein the advertiser AP is different from the current AP.

20. The apparatus of claim 15, wherein the advertiser AP comprises the target AP, the FT comprises an over-the-air FT.

21. The apparatus of claim 15, wherein the target AP is different from the advertiser AP, the FT comprises an FT over a Distribution System (DS) between the advertiser AP and the target AP.

22. The apparatus of claim 15, wherein one of the first and second frequency bands comprises a directional frequency band, and another one of the first and second frequency bands comprises a non-directional frequency band.

23. The apparatus of claim 15 comprising one or more directional antennas, a memory, and a processor.

24. A product comprising one or more tangible computer-readable non-transitory storage media comprising computer-executable instructions operable to, when executed by at least one computer processor, enable the at least one computer processor to implement operations at an advertiser Access Point (AP), the operations comprising:

transmitting a frame over a first frequency band, the frame comprising a Multiband Mobility Domain Element (MMDE) corresponding to a target AP, the MMDE comprising a band Identifier (ID) of a second frequency band, a Basic Service Set (BSS) ID (BSSID) of a BSS of the target AP on the second frequency band, a Mobility Domain ID (MDID) of a Mobility Domain (MD) to which the advertiser AP and the target AP belong, and a Fast BSS Transition (FT) field comprising FT information corresponding to the target AP;

processing an FT authentication request frame from a wireless station (STA) over the first frequency band, the FT authentication request frame to request an FT from a current AP on the first frequency band, which belongs to the MD, to the target AP on the second frequency band, the FT authentication request frame comprising the MMDE corresponding to the target AP; and transmitting to the STA an FT authentication response, the FT authentication response comprising the MMDE corresponding to the target AP.

25. The product of claim 24, wherein the MMDE comprises a channel ID of a channel to communicate with the target AP over the second frequency band.

* * * * *